United States Patent [19]

Beyer et al.

[11] Patent Number: 4,723,219

[45] Date of Patent: Feb. 2, 1988

[54] PROGRAMMED PATH FOR AUTOMATIC TOOL RETRACTION AND RETURN RESPONSIVE TO DEGRADATION THRESHOLD

[75] Inventors: Peter J. Beyer; Timothy F. Murphy; Donald W. Heckel, all of Fond du Lac, Wis.

[73] Assignee: AMCA International Corporation, Fond du Lac, Wis.

[21] Appl. No.: 747,809

[22] Filed: Jun. 21, 1985

[51] Int. Cl.⁴ ............................................ G05B 13/04
[52] U.S. Cl. .................................. 364/474; 364/170; 318/572
[58] Field of Search ............... 364/474, 475, 506, 507, 364/167, 170, 171; 318/563, 567, 570, 590

[56] References Cited

U.S. PATENT DOCUMENTS

| | | | |
|---|---|---|---|
| 3,496,805 | 2/1970 | Ulrichsen et al. | 77/1 |
| 3,812,474 | 5/1974 | Linn et al. | 340/172.5 |
| 4,045,660 | 8/1977 | Weisgerber et al. | 235/152.11 |
| 4,055,787 | 10/1977 | Beadle et al. | 318/591 |
| 4,086,517 | 4/1978 | Yamaki et al. | 318/39 |
| 4,107,785 | 8/1978 | Seipp | 364/900 |
| 4,442,493 | 4/1984 | Wakai | 364/475 |
| 4,442,494 | 4/1984 | Fromson et al. | 364/511 |
| 4,446,525 | 5/1984 | Hoch et al. | 364/474 |
| 4,509,126 | 4/1985 | Olig et al. | 364/474 |
| 4,513,380 | 4/1985 | Spooner et al. | 364/474 |
| 4,519,040 | 5/1985 | Brankamp et al. | 364/474 |
| 4,547,847 | 10/1985 | Olig et al. | 364/148 |
| 4,561,050 | 12/1986 | Iguchi et al. | 364/474 X |
| 4,575,791 | 3/1986 | Schwefed | 364/474 X |
| 4,597,040 | 6/1986 | Buizer | 364/170 |
| 4,604,560 | 6/1986 | Inagaki et al. | 364/474 X |
| 4,604,705 | 8/1986 | Imanashi | 364/474 |

FOREIGN PATENT DOCUMENTS

WO83/04445 12/1983 PCT Int'l Appl. .

OTHER PUBLICATIONS

Powell et al., "Sensing and Automation for Turning Tools," Technical Paper No. MS84-909, SME, Detroit, Mich., (Apr. 5, 1984).

"Tool Condition Sensor (TCS) Electrical Interface Specification," Rev. 2, Kennametal Inc., Latrobe, Pa., (Nov. 30, 1984).

"Kennametal Tool Condition Sensor: Functional Interface Specification," Rev. 2, Kennametal Inc., Latrobe, Pa., (Aug. 23, 1984).

(List continued on next page.)

*Primary Examiner*—Michael R. Fleming
*Attorney, Agent, or Firm*—Leydig, Voit & Mayer

[57] ABSTRACT

A general safe retract and return function is provided for a machine tool which is easily programmed for all cases to avoid collision and interference between the workpiece and tool and to reduce the damage or imperfection in the surface of the machined workpiece caused by the termination and/or resumption of machining. The general safe retract and return function includes parameters defining incremental retract and entry vectors relative to the direction of the machining path in the region of the interrupted point. Preferably the tool and workpiece are reengaged at the interrupted point along an entry ventor which is at a grazing angle with respect to the reverse of the tool feed direction along the machining path, thereby avoiding remachining of the workpieces but providing a smooth surface finish. Preferably the general safe retract and return function interprets programmer specified conditional expressions to determine when logical jumps should be performed to disengage the tool and workpiece and execute respective user-defined interrupt subroutines for corrective action. Preferably the logical jump for certain limit conditions or trigger signals is conditional based upon the engagement and disengagement of the tool and workpiece as specified by rapid traverse and feed rate moves, beginning and ending distances for the feed rate moves, and the depth of cut at the beginning and ending points of the feed rate moves.

17 Claims, 23 Drawing Figures

OTHER PUBLICATIONS

"Tool Condition Sensor Generalized Functional Interface Specification," Rev. 1, Kennametal Inc., Latrobe, Pa., (Mar. 29, 1984).

"Tool Failure Detection System" Brochure, Kabushiki Kaisha Komatsu Seisakusho, (Komatsu Ltd.), (One page).

"Mazatrol CAM M-2", Brochure, (One page).

"EIA Standard RS-477," Electronic Industries Association, (Oct. 1977).

"Mark Century" Manual GEK-25317, General Electric Co., Charlottesville, Va., (Jan. 1981), pp. 16-17.

"Mark Century" Manual GEK-25290, General Electric Co., Waynesboro, Va., (Sep. 1977), pp. 1, 16-17.

"Mark Century" Manual GEK-25260, General Electric Co., Waynesboro, Va., pp. 1, 4, 18-19.

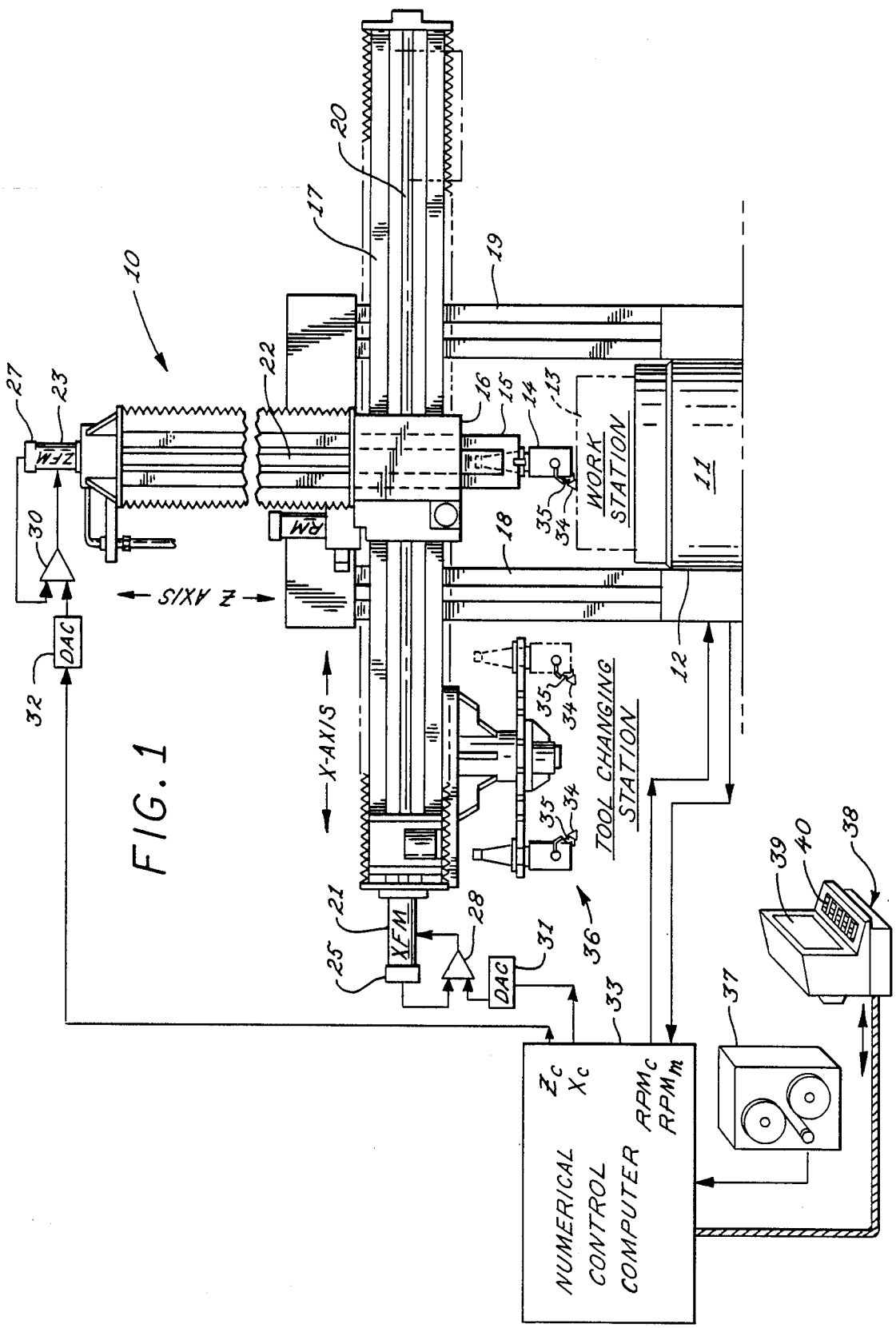

TOOL MONITOR PARAMETER TABLE

| LIMIT | CONDITION | ENR PARAM'S | ENS PARAM'S | ENE PARAM'S |
|---|---|---|---|---|
| HP MAX | AVHP.GT.75 | R1.0 T30 P1 | NIL | NIL |
| LTBL | KHPC.LT.75 | R1.0 T30 P2 | BTL CHANGE | R0.5 T5 |
| UTBL | KHPC.GT.150 | R1.0 T30 P2 | BTL CHANGE | R0.5 T5 |
| TWL | KHPCA.GT.125 | R1.0 T30 P2 | WTL CHANGE | R0.5 T5 |
| NIL | — | — | — | — |
| EOF | — | — | — | — |

Θ<0 AND
G02 CLOCKWISE
CIRCULAR INTERPOLATION
SHOWN (THIS EXAMPLE USES
OPERATOR'S VIEW PROGRAMMING)

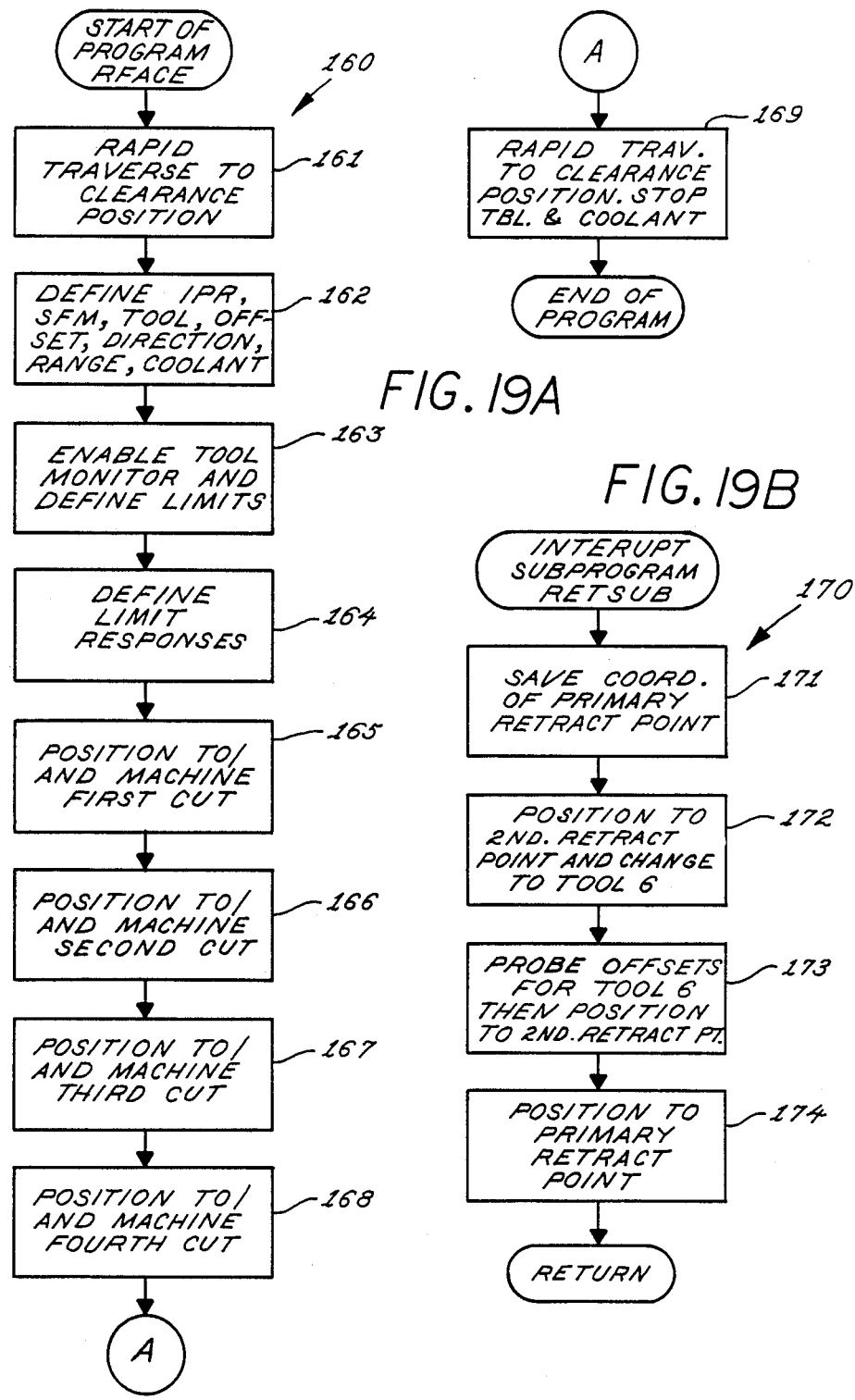

PROGRAMMED PATH FOR AUTOMATIC TOOL RETRACTION AND RETURN RESPONSIVE TO DEGRADATION THRESHOLD

BACKGROUND OF THE INVENTION

1. Technical Field

The present invention relates generally to numerically controlled machine tools, and more particularly to the interruption of machining along a programmed path in response to the sensing of tool degradation or improper machining conditions. Specifically, the present invention relates to automatic tool retraction from an arbitrary point along a machining path when an interrupt occurs, and automatic return of the tool or a replacement tool thereafter to continue machining, in such a fashion that the retraction and return of the tool does not cause collision or interference with the workpiece being machined.

2. Background Art

It is known to automatically interrupt the normal execution of the part program of a numerically controlled machine tool in response to the detection of abnormal machining conditions. Various kinds of machining conditions have been monitored, and different actions have been taken in response to the abnormal conditions.

Many schemes have been devised for sensing different tool conditions based on the force applied to the cutting tool. The force can be measured directly, but it is usually more convenient to monitor the electrical power consumed by spindle or feed motors.

Fromson et al., U.S. Pat. No. 4,442,494 issued Apr. 10, 1984, discloses a tool wear and tool failure monitoring system that senses the second time derivative of the net power applied to the cutting tool in order to detect approaching tool failure, and a statistical representation of such occurrences with a series of tools is used to determine the percentage wear of a tool. In claim 4, column 10, the operation of the machine tool is said to be shut off when the second derivative of the net power increases beyond a critical level.

Olig & Ladwig, U.S. Pat. No. 4,509,126 issued Apr. 2, 1985, (also published Dec. 22, 1983 as PCT application No. PCT/US83/00847 and international publication No. WO83/04445), discloses an adaptive control system that senses electrical power supplied to a spindle drive motor for a lathe, calculates net machining power at the cutter tip and cutting efficiency (i.e., net power required for removal of a unit amount of workpiece material), and monitors cutting efficiency to perform elementary tool wear, tool breakage, and tool protection functions. Adaptive control of machining rate in response to the net machining power is inhibited for a programmed beginning distance $A_p$ and ending distance $B_p$ with respect to a cut through the workpiece. The beginning and ending distances $A_p$, $B_p$ are said to be block constants or modal parameters. A "broken tool" feed hold is executed in response to the relative cutting efficiency dropping below a predetermined fraction of the initial cutting efficiency for the cut. A "tool protect" feed hold is executed in response to the relative cutting efficiency exceeding the initial cutting efficiency by a predetermined fraction. A "tool wear" feed hold is executed in response to a running average of the cutting efficiency exceeding the cutting efficiency of a sharp tool by a predetermined fraction.

A tool failure detection system advertised by Kabushiki Kaisha Komatsu Seisakusho (i.e., Komatsu Ltd.) is said to monitor the motor loads for the main spindle or feed axis, and judge whether each motor's load is normal. It is said that if a motor's load is judged abnormal, a safety cycle program functions to retrieve the tool being used to its tool changing position. The user is to press the start button after the tool with the abnormality is replaced. It is said that the new tool automatically returns to its original operating position, with cutting operations resumed.

The retraction of the tool from the workpiece and its subsequent return is itself a difficult operation for complex workpieces. For simple lathe machining tasks such as turning or facing, the tool can be retracted from the workpiece without collision or interference by incrementally moving the tool along a predetermined direction, and thereafter the tool can be moved directly to a tool change position. During retraction, the path traced by the tool can be stored in memory so that after a tool change the new tool can be returned to the workpiece and machining can be resumed where it was interrupted. In general, however, the path of the tool between the workpiece and tool change position must be chosen in response to the location of the tool when machining was interrupted. Otherwise, a collision or interference may occur between the tool and workpiece.

Ulrichsen and Brataas, U.S. Pat. No. 3,496,805 issued Feb. 24, 1970 discloses a method for automatic return movement of a toolholder along an arbitrarily chosen path, and new forward movement of the toolholder. The tool is moved back from an arbitrary point on the machining path to the tool change position by moving the tool along or parallel with the machining path in response to an auxiliary data set. From the tool change position the new tool is driven forward by the auxiliary data set to said arbitrary point, from which normal machining may resume.

Beadle et al., U.S. Pat. No. 4,055,787 issued Oct. 25, 1977 discloses a system wherein the tool may be promptly brought to a stop on the programmed machining path in response to any randomly timed feedhold signal, and thereafter moved under manual control away from the programmed path. The manually determined path is recorded, and in response to a restart signal the tool can be automatically returned to the interrupted point on the programmed path. The return path is determined by reverse retrace of the recorded path. Resumption of tool feed along the programmed machining path is inhibited until the tool is, in one way or another, returned to the interrupted point on the programmed path.

Wakai et al., U.S. Pat. No. 4,442,493 issued Apr. 10, 1984 discloses a system wherein a tool is automatically retracted from a workpiece, along a path determined in response to the current mode of the machining operation. Based upon information found in the program controlling the normal machining operations, the mode of the machining operation is determined to be either external diameter machining, edge face machining, or internal diameter machining. This information, combined with the position of the interrupted point along the machining path and the machining mode, and with a programmed parameter relating to the size of the workpiece, are said to be mathematically processed to determine a retract path to a first position of clearance from the workpiece and thence, avoiding contact with the workpiece, to a tool change position. It is further said that the cutting tool is returned to the normally programmed machining path at a point preceding, in sequence, the interrupted point in order to provide an overlapping of machining in that region. Tool retreat and return modes are stored on predetermined blocks of an NC tape. Transfer codes are also stored on the NC tape to select these modes. The transfer codes include, for example, M81, M82, and M83 corresponding to the external diameter machining mode, the edge facing machining mode, and the internal diameter machining mode. It is said that each mode includes variables representing retreat start position (i.e., the coordinates of the interrupted point), the retreat position, etc. Data for the retreat position is, for example, programmed into the NC tape or manually entered by an operator. An abnormal machining condition is sensed by comparison of feed motor current to a selected threshold current. A plurality of threshold currents are provided for respective portions of the workpiece and respective tools. The appropriate threshold is selected in response to "T codes" in the part program.

Kennametal, Inc. of Latrobe, Pennsylvania 15650 has developed a tool condition sensor for generating interrupt and tool worn signals, and has considered appropriate responses of a numerically controlled machine tool to the interrupt and tool worn signals. In accordance with the preferred responses, a worn tool is retracted and replaced at the end of the cut. Retraction of the tool includes an incremental move away from the workpiece followed by one or more secondary moves to the tool change position. The moves are programmable. For a broken tool, the preferred response is an immediate retract followed by a change of both the tool and the workpiece. These preferred responses were implemented on a Dynapath control using the macro capability of the control. During a demonstration of this system at the September 1984 International Machine Tool Show (IMTS) in Chicago, the tool changes were followed by a tool offsetting cycle using a vision system. General aspects of such a system were disclosed in Powell et al., "Sensing and Automation For Turning Tools," Technical Paper No. MS84-909, Society of Manufacturing Engineers, Detroit, Mich. (Apr. 5, 1984).

The Kennametal tool condition sensor is further described in a report titled "Electrical Interface Specification," Revision 2 (Nov. 30, 1984). The tool condition sensor monitors feed force, radial force and tangential force with respect to the tool, and transmits a tool worn signal and priority interrupt signals to the machine tool. The priority interrupts include a tool breakage interrupt, a transducer overload interrupt, and a fault interrupt. The tool breakage interrupt indicates that either tool breakage or tool chipping has occurred. The transducer overload interrupt indicates that abnormal machining conditions have been encountered. The fault interrupt indicates that a malfunction has occurred.

The suggested programming or configuration of the machine tool control for use with the Kennametal tool condition sensor is described in a report titled "Kennametal Tool Condition Sensor: Functional Specification," Revision 2 (August 1984). In particular, the machine tool control must initiate and execute a suitable recovery sequence in response to the tool worn or priority interrupt signals. The suggested recovery sequence for a tool worn sequence is to finish the cut, safe retreat, change the tool, and continue cutting. If the tool is not used again for machining the current workpiece, however, the tool change can be delayed until machining of the current workpiece is finished. In response to a tool broken interrupt, an immediate "motion hold" is required, which should be followed by a safe retreat to the tool change position. To avoid any problems which may occur due to tool debris embedded in the unfinished workpiece, the recommended strategy is to change the workpiece and start machining from the start of the new workpiece. Also, in the special case of a threading operation, the tool must be retracted far enough to clear the threads before execution of the motion hold; otherwise, the existing threads will be ruined and further damage to the tool may occur. In a similar fashion, the recommended strategy in response to an overload or a fault interrupt includes an immediate motion hold and a safe retract, but thereafter a request for operator assistance is flagged. To implement these recovery strategies, the machine tool control must include a "logical jump on external trigger" feature and a safe retract feature. The logical jump on external trigger feature requires the capability of initiating a logical jump in the part program in response to an external trigger and keeping track of where the jump occurred so that execution may return and continue from the interrupted point. The safe retract feature requires the capability of safely moving the cutting tool from any arbitrary point in the part program to the tool change or turret index position.

The "Kennametal Tool Condition Sensor: Functional Interface Specification" considers alternative safe retract strategies. It is said that the absolute safe method is to run the part program in reverse to the previous turret index position. It is said that this may be difficult if not impossible to implement in existing controls but should be included as an integral feature in future system designs. It is further said that an alternative safe retract strategy, described in an Appendix A, should be simpler to implement although more cumbersome to use; moreover, it is said that it involves an increased part program burden and is not immune to programmer error. It is recognized that most modern machine tool controls provide some form of customer programmable macro capability including high level language functions. In accordance with the alternative safe retract strategy, it is suggested that this capability be exploited to write a general safe retract function which can be configured to particular situations. The macro call statement for the function will be placed in the part program block to which it applies and will contain the parameters necessary to configure the macro for the conditions pertaining to that portion of the part program. The general safe retract function will consist of a series of moves to get the tool back to the turret index position. The moves include (1) an incremental jog away from the workpiece; (2) optional X and Y moves to clear obstructions; (3) for outside diameter tools, an X followed by Z retract to the turret index position; and (4) for inside diameter tools, an X retract to the spindle center line followed by Z and X retracts to the turret index position. It is said that a fairly simple general safe retract macro can be constructed which is configured by a minimal number of parameters included in the call statement. A specific example is the call statement:

MACRO#(IF SET, ID/OD, ORIENT., JOG, X, Z, X, Z)

The parameter "IF SET" denotes the trigger which executes the logical jump to the macro, the parameter ID/OD specifies whether the cutter is inner or outer diameter, the parameter ORIENT. is the tool orientation used as direction for the incremental jog, the parameter JOG is the incremental jog distance, and the parameters X and Z are optional axis move parameters used to avoid obstacles.

The Kennametal general safe retract function invoked by the macro call is an example of a predefined stored program or "canned cycle" which is called up by the user's part program. Canned cycles are commonly supplied by a machine tool manufacturer to assist the user in programming repetitive functions as repeated calls to the canned cycles. Canned cycles can be general purpose as well as example, discloses the use of a microprogram executed specific to a particular machining path. Hotch et al., U.S. Pat. No. 4,446,525 issued May 1, 1984, for by a processor which recognizes parameters in the macroprogram as belonging to a set of parameters having values defined in a parameter table. During execution of the macroprogram, the processor obtains the respective values from the parameter table. Therefore, the machine operator may effectively edit part program blocks just prior to running them by changing selected values stored in the parameter table.

SUMMARY OF THE INVENTION

In view of the above, the general aim of the invention is to facilitate the use of an automatic safe retract and return strategy for a numerically controlled machine tool that in all cases avoids collision and interference between the workpiece and tool and that reduces imperfections in the surface finish of the machined workpiece.

Another object of the invention is to reduce the burden of programming a general safe retract and return function for a desired machining path. In this regard, a related object is to reduce the likelihood of programmer error during implementation of a specific safe retract and return strategy.

Yet another object of the invention is to prevent erroneous triggering of the tool retract function.

According to the invention, a general safe retract and return function is provided which is easily programmed for all cases to avoid collision and interference between the workpiece and tool and to reduce the damage or imperfection in the surface of the machined workpiece caused by the termination and/or resumption of machining.

According to an important aspect of the invention, the general safe retract and return function includes parameters defining an incremental retract vector relative to the direction of the machining path in the region of the interrupted point. Preferably the parameters specify the distance of the retract vector and angle of the retract vector with respect to the direction or tool feed vector of the machining path at the interrupted point. By defining the incremental retract vector relative to the tool feed vector, a safe retract function can be programmed using fewer macro calls to the general function since for complex curved surfaces the incremental retract vector is modified in response to the location of the interrupted point.

According to another important aspect of the invention, the general safe retract function includes parameters defining an incremental entry vector for reengaging the tool and workpiece at the interrupted point, the entry vector being at a grazing angle with respect to the machined surface, so that the tool does not touch the workpiece at a previous point and remachining of the workpiece does not occur. Consequently, the surface finish of a machined workpiece will not be damaged or marked due to remachining after a tool retract and return. Preferably the parameters defining the incremental entry vector are referenced to the programmed tool feed vector along the programmed path, and the entry vector is defined by a parameter specifying the distance of the entry vector and its angle with respect to the tool feed vector along the programmed path at the interrupted point.

According to another feature of the invention, the general safe retract function is programmed in the part program by at least one definitional function call including part programmer specification of the chosen tool or machining conditions and respective limits, along with the corrective action to be taken in the event that the specified limits are reached. In other words, the comparison of different tool or machining condition signals to different respective thresholds may result in a logical jump to different subroutines, and the part programmer need not be concerned with the underlying framework for the logical jumps to the subroutines for the respective cases. The general function interprets a specified conditional expression to test for the presence of conditions necessary for an interrupt or logical jump to the specified action. Special macro calls, however, are provided for setting or changing specific parameters in modal fashion to eliminate the need for repeating more general macro calls.

In accordance with yet another feature of the invention, the interrupting of normal machining is selectively conditioned on the engagement and disengagement of the tool and workpiece in order to avoid false retracts due to transients when the cutter engages or disengages the workpiece. Preferably the general safe retract and return function includes parameters B and E for specifying beginning and ending distances, respectively, of a cut within which interrupting of normal machining is inhibited except in response to specified maximum limits being exceeded. To avoid the need for sensing or otherwise determining the points along the machining path where engagement and disengagement actually occurs, the interrupting of normal machining alternatively could be selectively inhibited for a specified beginning and ending distance of the machining moves.

BRIEF DESCRIPTION OF THE DRAWINGS

FIG. 1 is a front elevation of a computer-controlled vertical machining center having an automatic tool changing station;

FIG. 19A is a flowchart of the part program for the programming example corresponding to FIGS. 18A and 18B; and FIG. 19B is a flowchart of the interrupt subprogram for the programming example.

Figure 2A:
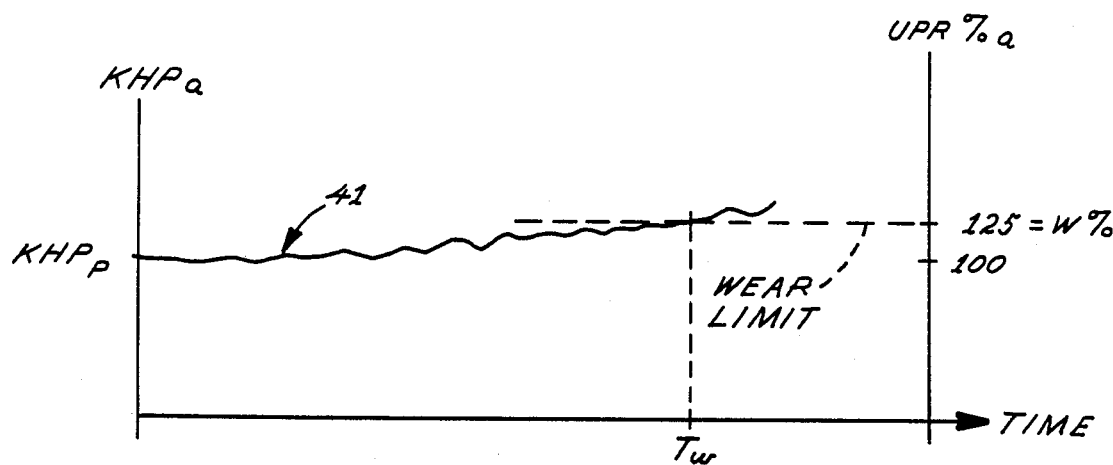
FIG. 2A is a graph for a particular tool of the average horsepower constant as a function of time showing the average horsepower constant gradually increasing as the tool becomes worn and reaching a wear limit.

While the invention has been shown and will be described in some detail with reference to exemplary preferred embodiments, there is no intention that the invention be limited to such detail. On the contrary, it is intended to cover all modifications, alternatives, and equivalents which fall within the spirit and scope of the invention as defined by the appended claims.

DESCRIPTION OF THE PREFERRED EMBODIMENTS

In order to illustrate one particular environment in which the present invention will find especially advantageous use, it will be described here in conjunction with a computer controlled vertical machining center 10 shown in FIG. 1. This evemplary machine tool includes a rotatable work table 11 adapted to hold and rotate a workpiece 13 which is machined to a desired contour in an X-Z coordinate system. The Z axis of the coordinate system is conventionally defined as the axis of rotation of the work table 11 and workpiece 13. A tool 14 is mounted on and movable with a ram 15 which is slidable along the Z axis, within vertical ways formed on a saddle 16. The saddle is in turn movable horizontally along an X axis defined by the ways of a rail 17 which is supported by a pair of spaced vertical columns 18 and 19. The tool 14 may thus be moved along orthogonal horizontal and vertical axes X and Z relative to the workpiece 13. By proper proportioning of the X and Z axis components of commanded movement and velocity of the ram 15, as well as the rotational velocity of the work table 11, the tool 14 moves through the workpiece 13 along a path and at a depth chosen to cut a desired contour thereon. To produce such controlled movement of the tool 14 relative to the workpiece, the saddle 16 includes a nut engaged with a lead screw 20 driven through suitable gears by a reversible servo motor 21. As the motor 21 is caused to rotate in one direction or the other at different speeds, the saddle 16 is moved horizontally in the plus X or minus X directions and at velocities determined by the speed of the motor 21. Correspondingly, the ram 15 carries a nut engaged with a vertically disposed lead screw 22 driven by a reversible servo motor 23 so that energization of that motor in one direction or the other moves the tool 14 in the plus Z or minus Z directions.

The X- and Z-axis motors 21 and 23 form portions of X- and Z-axis servo systems which energize the motors with selected voltages based upon the error between a desired position and an actual position. To signal the actual positions of the tool along the two axes, feedback transducers such as rotary resolvers 25 and 27 are driven in unison with or in geared relation to the corresponding lead screws. Their respective feedback signals are returned to servo amplifiers 28 and 30 which respectively receive the analog signal outputs of digital-to-analog converters (DAC's) 31 and 32, which in turn receive the changeable digital output signals $X_c$ and $Z_c$ of a numerical control computer 33. The DAC's of the servo systems are so familiar to those skilled in the art that no further details need be given, except to note that the servo loops with relatively high gain serve to keep the X and Z positions of the tool 14 dynamically in substantial agreement with the changing digital output signals $X_c$ and $Z_c$ from the computer 33. The controlled members thus move at axis velocities $V_x$ and $V_z$ corresponding to the rates of change of those signals.

The actual cutting of the workpiece 13 is effected by a removable and replaceable insert 34 held in an insert holder 35 carried by the tool 14. Machine tools of this type are often equipped with automatic tool changers, such as the automatic tool changer 36 illustrated at the left-hand side of the vertical machining center 10 in FIG. 1. Consequently, a variety of different tools 14 can be used for different machining operations, or even in different stages of a single machining operation. These different tools use a variety of different inserts 34, and a variety of insert holders 35 can also be located in variety of different positions and attitudes on the various tools 14. The computer 33 which controls the machine tool contains information about the particular tool and the particular position or offset of the insert in the particular tool.

The cutting insert 34 gradually becomes worn and must be replaced. Also, it is not uncommon for the insert 34 or the insert holder 35 to break during machining. If the insert 34 becomes excessively worn or if the insert or insert holder 35 breaks during machining, it is necessary to stop machining at this arbitrary point and to change the tool 14 or insert 34. For this purpose the tool 14 is safely withdrawn from workpiece 13 and changed or exchanged with a replacement tool at the tool changing station 36. Then, the changed or replacement tool can be returned to the workpiece 13 to continue machining. As will be described further below, this tool change operation is only one of a number of actions that could be performed when the tool 14 becomes excessively worn or broken during machining.

Preferably excessive tool wear or tool breakage is automatically monitored and quickly detected in order to protect the workpiece and tool from being damaged by a worn tool condition, or to prevent further damage to the tool or workpiece from occurring after tool breakage. Of course, automatic detection and correction of excessive tool wear or tool breakage is especially important during unattended machining operations. Another reason for automatic monitoring of the tool is to reduce insert costs by promoting optimal usage of the insert. Instead of changing the insert after a conservative fixed time interval, the insert can be changed in response to its actual condition or degradation.

A relatively easy and unobtrusive method of monitoring the condition of the machining process at the tool/workpiece interface is to monitor the actual power consumed during the machining operation. In particular, tool wear is defined as the gradual deterioration of the cutting insert edge caused by the machining process. Typically, as the tool wears or dulls, the cutting forces and the actual cutting power gradually increase. Tool breakage, on the other hand, is defined as the catastrophic failure or destruction of the cutting insert. When insert breakage occurs, the cutting forces and the actual cutting power will either quickly decrease due to interruption of the cutting process or quickly increase due to wedging of the broken insert into the workpiece.

The monitoring of cutting power is also useful for sensing the wear of tools for machining operations other than the single point turning operation illustrated in FIG. 1. Although the present invention will be described in detail in the context of a vertical machining center, it is easily applied to horizontal machining and to milling, drilling, and boring operations.

In general, the actual cutting power is a function of the rate at which machining occurs and the properties and characteristics of the workpiece material as well as the condition of the cutting edge. Consideration of these and other factors have been described in Olig and Ladwig U.S. Pat. No. 4,509,126 issued April 2, 1985, discussed above, for the purpose of adaptive control of the machining process. As further described therein, the difficulty of cutting or machining a workpiece of a particular material is advantageously quantified by a horsepower constant (KHP) defined as the power required for a unit rate of removal of material from the workpiece. In terms of British units, the horsepower constant (KHP) denotes the horsepower required for removing one cubic inch of material every minute. The rate of removal of material from the workpiece is proportional to the feed rate of the tool with respect to the workpiece (IPR) in inches per revolution of the workpiece, the surface speed of the workpiece with respect to the tool (SFM) in feet per minute, and the depth of cut of the tool with respect to the workpiece (DOC) in inches. In these British units, a calculated horsepower constant ($KHP_c$) can be obtained from measured and known data according to the formula:

$$KHP_c = \frac{HP_c}{IPR \times SFM \times DOC \times 12} \quad \text{(Equation 1)}$$

where $HP_c$ is the actual cutting power in horsepower. The factor 12 relates inches to feet, and if a rationalized set of units were used, such as the metric or MKS system, the factor of 12 would not be needed.

From Equation 1 above, it can be seen that in order to determine the horsepower constant (KHP) the cut horsepower ($HP_c$), feed rate (IPR), surface speed (SFM) and depth of cut (DOC) must be known or measured. The cut horsepower ($HP_c$) is calculated from the gross measured motor horsepower, as further described below. The feed rate (IPR) and surface speed (SFM) are known from the commanded positions $Z_c$ and $X_c$ of the tool 14 and from the commanded or measured rotational velocity ($RPM_c$, $RPM_m$) of the table 11. In other words, the feed rate (IPR) and surface speed (SFM) are known parameters within the control values for these parameters are programmed into a part program read by a tape drive 37 and executed by the numerical control computer 33. Also, it is desirable to permit the machine operator (not shown) to adjust or override the programmed values via a work station 38 including a display 39 and keyboard 40 interfaced to the computer 33.

Since the horsepower constant (KHP) is independent of the actual speed and feed, it is a reliable measure of the condition of the cutter when the speed and feed are adjusted by adaptive control and/or operator overrides. But the horsepower constant (KHP) is a reliable indication of the condition of the cutter only for machining operations where the depth of cut (DOC) is known. Therefore, the horsepower constant (KHP) may be a poor indication for certain roughing cuts. Also, variations in material hardness will cause changes in the value of the cut horsepower (KHP) which are indistinguishable from changes caused by a worn or broken tool.

Figure 2B:
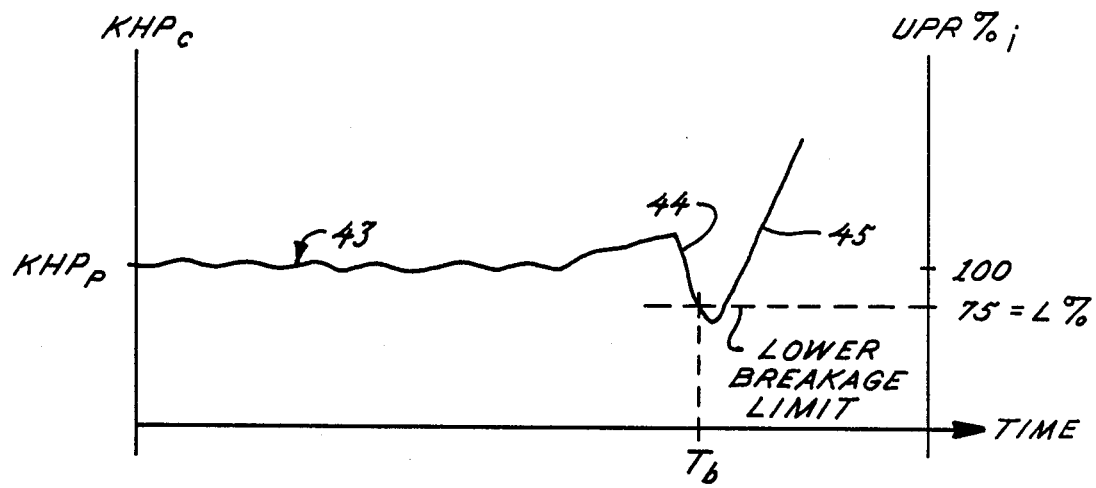
FIG. 2B is a graph for a particular tool of the calculated horsepower constant as a function of time showing a lower breakage limit being reached during breakage of the tool.
Figure 2C:
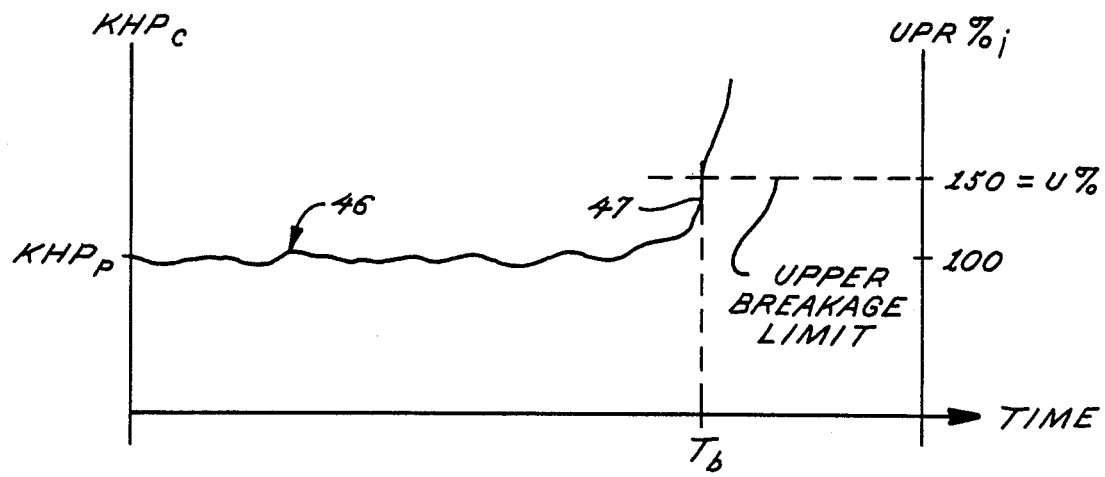
FIG. 2C is a graph for a certain tool of the calculated horsepower constant as a function of time showing an upper breakage limit being reached during breakage of the tool.

Turning now to FIGS. 2A, 2B, and 2C, the procedure of monitoring the horsepower constant (KHP) for detecting more than one tool condition is illustrated. Specifically shown in FIG. 2A is a procedure for detecting the gradual wear of an insert. As the cutting edge of the insert wears, the cutting or machining process becomes less efficient. Since the horsepower constant (KHP) is a measure of cutting inefficiency, the horsepower constant gradually increases as the insert becomes worn. In order to suppress noise, caused, for example, by a fluctuating depth of cut (DOC) or fluctuating material hardness, and to distinguish from tool breakage as further described below, an excessively worn tool is sensed by comparing a threshold or wear limit to an average value of the horsepower constant computed or accumulated over a certain time period. The duration of this time period is chosen to be greater than the time required for detecting tool breakage as further described below.

In practice, it is preferable to calculate the horsepower constant (KHP) on a periodic basis, and to compute the average ($KHP_a$) as the average of a predetermined number of consecutive values that were last calculated. Preferably the average includes at least four values. But the number of last values that are averaged is preferably a function of the period over which the calculation are performed in order to obtain a certain time interval over which the average is calculated. For a sixty-four millisecond time between calculations, for example, preferably sixteen values are averaged in order to obtain an interval of about one second over which the values are averaged.

In order to establish a limit independent of the absolute value of the horsepower constant (KHP), the wear limit (W) is preferably expressed as a percentage or fraction of a programmed horsepower constant ($KHP_p$) which should be determined experimentally for each workpiece material and tool geometry. When a new or sharpened insert is first used for a cut, for example, the average horsepower constant ($KHP_a$) at the beginning of cutting is stored as the programmed horsepower constant ($KHP_p$). As described further below, a specific function to be included in the part program is provided for storing the programmed horsepower constant.

Once the programmed horsepower constant ($KHP_p$) is stored, a unit power ratio (UPR) is calculated according to:

$$UPR = \frac{KHP_c}{KHP_p} \quad \text{(Equation 2)}$$

or in terms of percent:

$$UPR \% = \frac{KHP_c}{KHP_p} \times 100 \quad \text{(Equation 3)}$$

where
UPR=Unit Power Ratio
$KHP_c$=Calculated Horsepower Constant
$KHP_p$=Programmed Horsepower Constant To test for a worn tool, the unit power ratio (UPR) is compared to a wear limit (W) which is conveniently expressed as a percentage. As shown in FIG. 2A, the percentage wear limit (W%) is set at 125 and the limit is compared to the average horsepower constant ($KHP_a$) to detect that the tool becomes excessively worn at a certain time ($T_w$) and to generate a triggering signal in response to the comparison. As further described below, the numerical control computer 33 responds to this tool wear triggering signal in a user programmable manner.

Turning now to FIG. 2B, there is shown one possible response 43 of the horsepower constant ($KHP_p$) to insert breakage. The response 43 includes a sharp drop 44 caused by the interruption of the machining process after the insert breaks so that there is no longer contact between the tool and workpiece. The sharp drop 44 is followed by a sharp rise 45 in the horsepower constant ($KHP_c$) as the broken insert again engages the surface of the workpiece. To detect this particular kind of tool breakage event, the calculated horsepower constant ($KHP_c$) is compared to a lower breakage limit or threshold (L) and a tool breakage trigger signal is generated at the time ($T_b$) when the lower breakage limit is reached. As in the case for tool wear, it is convenient to express the lower breakage limit (L) as a particular value of the unit power ratio (UPR) and in particular as a percentage. As shown in FIG. 2B, the percentage lower breakage limit (L%) is set at 75.

FIG. 2C shows a second possible response 46 of the horsepower constant to insert breakage. In this case the insert breaks but immediately wedges between the insert holder and the workpiece, resulting in a continuous and rapid rise in the calculated horsepower constant ($KHP_c$). Tool breakage is detected at a certain time ($T_b$), and a trigger signal is generated, in response to a comparison of the calculated horsepower constant ($KHP_c$) to an upper breakage limit (U). As before, it is convenient to express the upper breakage limit (U) as a particular value of the instantaneous unit power ratio (UPR) and in particular as a percentage. As shown, the percentage upper limit (U%) is set at 150.

The responses of the numerical control computer 33 and machine tool 10 to the worn tool trigger signal and the broken tool trigger signals do not necessarily have to be the same. Although in the case of a breakage limit the typical response is to replace the entire tool 14, in the case of a worn insert 34 it may be possible to merely change the insert 34, for example, in the case of an insert having a number of cutting edges, by indexing the insert so that a fresh edge is moved to a cutting position.

For the breakage condition in FIG. 2C to be distinguishable from the tool wear condition shown in FIG. 2A, the upper breakage limit (U) must exceed the wear limit (W) and the wear limit (W) must be defined as an average value of the horsepower constant (KHP). In particular, the time over which the average horsepower constant ($KHP_a$) is calculated should be greater than the time for the rising portion 47 of the response 46 in FIG. 2C to rise from the value of the wear limit (e.g. 125%) to the value of the upper breakage limit (e.g. 150%). Also, to eliminate false triggers, it may be necessary to perform some averaging on the calculated horsepower constant ($KHP_c$) before comparison to the lower breakage limit and the upper breakage limit. The same result may be achieved by requiring the instantaneous value of the unit power ratio (UPR) to be outside of the range between the corresponding breakage limits (L) and (U) for two or more consecutive samples. Before replacing the broken insert, the tool should be inspected to determine whether a new insert holder or a tool exchange is required to correct for any extensive damage to the tool.

Figure 3:
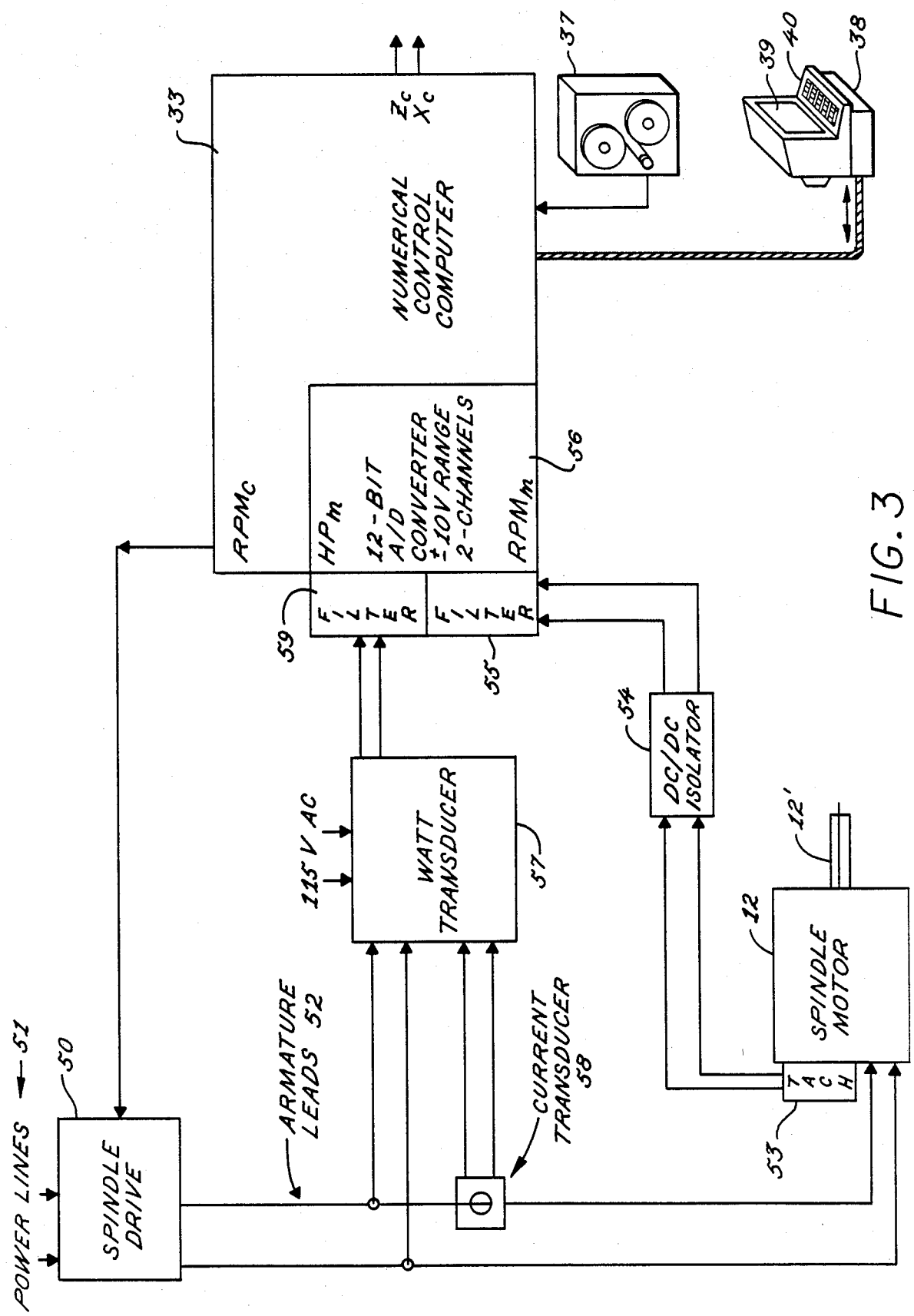
FIG. 3 is a block diagram of circuits for sensing the power delivered to a spindle motor in a machine tool such as the machining center of FIG. 1.

Turning now to FIG. 3, there is shown a schematic diagram of a preferred arrangement for sensing the horsepower constant (KHP) of the tool and workpiece combination. As discussed above, determination of the horsepower constant (KHP) requires measurement of the actual cutting horsepower ($HP_c$) as well as the rotational velocity (RPM) of the workpiece 13.

In order to drive the spindle motor 12, a spindle drive 50 receives electrical power from the power lines 51 and in response to a speed control signal ($RPM_c$) a regulated amount of power is transferred from the power lines 51 to the armature leads 52 of the spindle motor 12. The spindle drive 50, for example, includes thyristors and the firing angle of the thyristors is adjusted by the speed control signal ($RPM_c$) in an attempt to obtain the desired speed. Due to the relatively large rotational inertia of the spindle motor 12, the worktable 11 and the workpiece 13, the actual speed ($RPM_m$) may substantially deviate from the desired speed ($RPM_c$). Therefore, in practice it is necessary to directly measure the rotational velocity of the workpiece 13, for example, by the use of a tachometer 53 sensing the rotation of the shaft or journal 12' of the spindle motor 12. To prevent ground loop problems, the signal from the tachometer 53 is passed to the numerical computer 33 through a DC/DC isolator 54. The output of the isolator 54 is also passed through a filter 55 to reject noise such as components at the 60 Hz line frequency, and is converted to a numerical value by one channel of a 2-channel 12-bit analog-to-digital converter 56.

An alternative method of measuring the rotational velocity of the table 11 or workpiece 13 is by means of a rotary position trasnducer such as an angle resolver. A resolver may already be provided for automatic cutting of threads on the workpiece. In any event, the rotational velocity is the time rate of change of the angular position, and is proportional to the difference between successive angular position values sampled on a periodic basis.

In order to measure the gross power fed to the spindle motor 12, a watt transducer 57 senses the voltage across the armature leads 52 and receives a signal from a current transducer 58. The instantaneous voltage is multiplied by the instantaneous current to obtain a true power signal which is fed through a filter 59 to the second channel of the analog-to-digital converter 56. A suitable watt transducer is the OSI DC Watt Transducer model PC8-4-04 manufactured and sold by Ohio Semitronics, 1205 Chesapeake Avenue, Columbus, Ohio 43212.

Ideally the numerical control computer 33 should determine and update the horsepower constant (KHP) as quickly as possible so that the control may respond instantaneously to changes in the horsepower constant. Due to the finite amount of time available to perform calculations within the control, however, the calculations are periodically performed at a maximum rate of about one update every 40 milliseconds. To reduce electrical noise, at such a fast sampling rate, corresponding to five updates per revolution at 300 RPM, digital filtering or averaging of the updated values may be necessary.

Preferably the horsepower constant (KHP) is calculated from the true power expended at the cutter tip ($HP_c$) rather than from the gross measured electrical power ($HP_m$) fed to the spindle motor 12. The true power expended at the cutter tip ($HP_c$) is preferably derived from the gross power ($HP_m$) by subtraction of the estimated electrical resistive loss ($HP_e$), mechanical friction loss ($HP_v$), and the net power transferred to the inertial mass of the workpiece and all of the rotating parts of the machine tool during net acceleration ($HP_a$) according to:

$$HP_c = HP_m - HP_e - HP_v - HP_a \qquad \text{(Equation 4)}$$

The electrical resistive loss or power consumed and dissipated as heat in the motor winding circuit of the spindle motor 12, is proportional to the characteristic resistance ($R_e$) of the motor windings and the square of the current (I) flowing through the drive motor:

$$HP_e = (I^2)(R_e)/(746) \qquad \text{(Equation 5)}$$

where $HP_e$ is in units of horsepower, I is in units of amperes, and $R_e$ is in units of ohms. The factor of 746 is used to convert watts to horsepower. The resistance ($R_e$) may be measured with an ohmmeter or may be supplied by the motor manufacturer. The drive motor current (I) may be continuously measured with an ammeter, for example, the current transducer 58, but for a DC spindle motor 12 satisfactory results may be obtained by determining the current (I) from the gross measured horsepower ($HP_m$) and the measured rotational speed ($RPM_m$). If the voltage (V) across the motor windings is known, then the current (I) related to measured horsepower ($HP_m$) expressed in watts ($W_m$) as:

$$W_m = (746)(HP_m) \qquad \text{(Equation 6)}$$

according to:

$$I = W_m/V \qquad \text{(Equation 7)}$$

$$HP_e = \frac{W_m^2}{V^2}(R_e)/(746) \qquad \text{(Equation 8)}$$

But the voltage (V) need not be measured directly since for a DC motor the voltage (V) is approximately a linear function of the rotational velocity (RPM) up to a known base speed (BS) at which the voltage (V) assumes a constant rated voltage ($V_{op}$) so that:

$$V = \frac{(RPM)(V_{op})}{BS} \text{ if RPM} \leq BS \qquad \text{(Equation 9)}$$

$$V = V_{op} \text{ if RPM} \geq BS$$

The base speed (BS) and rated voltage ($V_{op}$) are constants characteristics of a given type of motor and are usually stamped on the motor name plate by the motor manufacturer.

Mechanical friction loss ($HP_v$) is essentially proportional to the rotational velocity (RPM). The frictional loss predominates at a constant rotational velocity (RPM). Satisfactory results are obtained by assuming that the total frictional loss ($HP_v$) is a linear function of the pre-determined coefficient of friction ($M_s$) and intercept constant ($B_i$) according to:

$$HP_v = (M_s)(RPM) + B_i \qquad \text{(Equation 10)}$$

The friction ($M_s$) and intercept ($B_i$) constants are preferably determined for each workpiece by initially cycling the machine with the cutting tool disengaged up to several different constant rotational velocities (RPM). Then the frictional loss ($HP_v$) at each constant rotational velocity (RPM) is determined by subtracting the electrical loss ($HP_e$) from the gross measured horsepower ($HP_m$). A standard least squares statistical procedure can be used to compute the constants ($M_s$) and ($B_i$) from the various data points of the rotational velocity (RPM) and associated frictional loss ($HP_v$). A more precise estimate for the frictional loss ($HP_v$) could be obtained by fitting the measured frictional loss ($HP_v$) as a function of rotational velocity (RPM) to a quadratic or higher order polynomial or function of rotational velocity (RPM).

Variations in the gross measured power ($HP_m$) due to acceleration are very significant since they may result in changes in the horsepower constant (KHP) of the same magnitude as the changes caused by significant tool wear or tool breakage. The net power required for acceleration is proportional to the torque and the rotational velocity (RPM), but the torque (T) is itself proportional to a constant moment of inertia (J). And the time rate of change of the rotational velocity (dRPM/dt) according to:

$$T = (J)(dRPM/dt) \quad \text{(Equation 10)}$$

$$HP_a = \frac{(J)(RPM)(dRPM/dt)}{63,000}$$

the units conversion factor of 63,000 is used for converting the British units in the above equations.

For a turning machine such as the vertical machining center 10 shown in FIG. 1, the moment of inertia J is preferably determined for each workpiece by an initial procedure wherein the machine tool is accelerated and decelerated with the cutting tool disengaged. The power due to acceleration ($HP_a$) is calculated from the gross measured power ($HP_m$) when the rotation velocity (RPM) is changing:

$$HP_a = HP_m - HP_e - HP_v \quad \text{(Equation 11)}$$

Thus the moment of inertia (J) is computed as:

$$J = \frac{(HP_a)(63,000)}{(RPM)(dRPM/dt)} \quad \text{(Equation 12)}$$

During an initial procedure, the constants ($M_s$) and ($B_i$) estimating the frictional loss ($H_v$) are preferably determined during an initial step of stepwise acceleration of the spindle motor, and then the moment of inertia J is calculated during a continuous deceleration of the spindle motor. Alternatively, for a DC spindle motor, the moment of inertia (J) is quickly calculated during a subsequent acceleration by driving the DC motor with a large stepwise change in commanded velocity ($RPM_c$). Then the DC spindle motor responds automatically by continuously accelerating at a constant rate, at least so long as the rotational velocity (RPM) is less than the DC spindle motor's base speed (BS). This technique exploits the fact that a DC drive motor, as typically used in machine tools, has a constant maximum torque when operating below base speed (BS).

The final value required for the calculation of the horsepower constant ($KHP_c$) is the depth of cut (DOC). The depth of cut is defined as the dimension of the cut normal to both the direction of feed of the tool into the workpiece, and the direction of the workpiece surface with respect to the tool (SFM). Therefore, the product (DOC)(IPR)(SFM)(12) is the volumetric rate of workpiece material removal in cubic inches per minute when (DOC) is in inches, (IPR) is in inches per revolution and (SFM) is in surface feet per minute.

Figure 4:
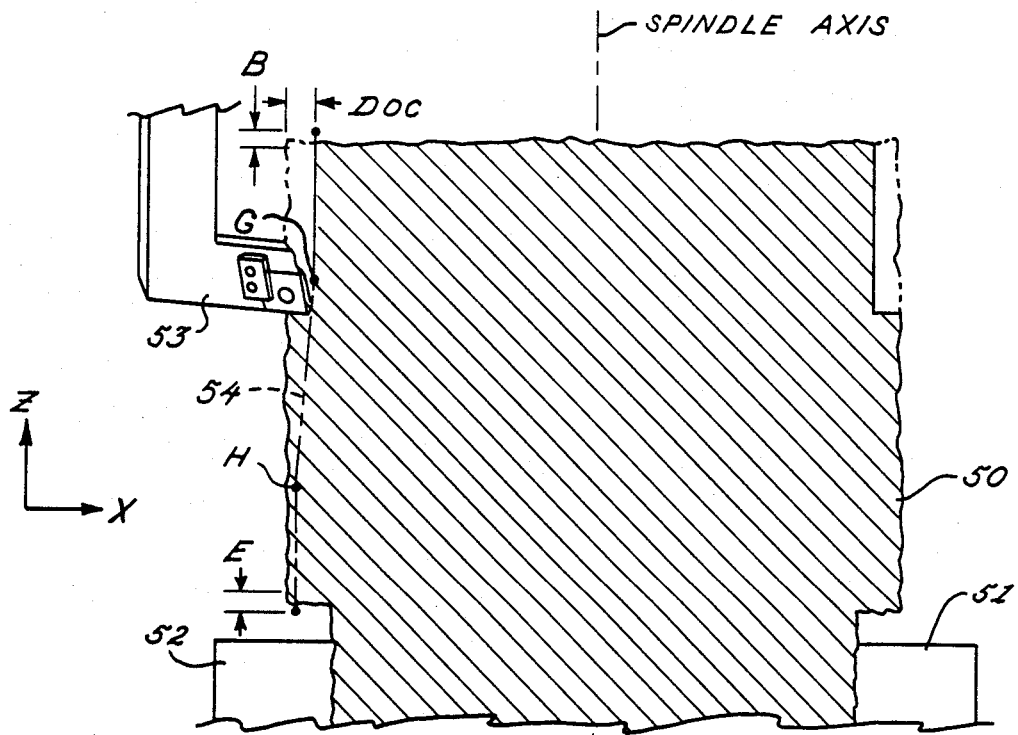
FIG. 4 is a schematic drawing of the tool-workpiece interface for the machining center of FIG. 1, with the workpiece being shown in cross-section, and a tapered cut being performed.

For computational simplicity, the depth of cut (DOC) is assumed to vary linearly along the length of a cut. FIG. 4 shows an external turning operation for a workpiece 50 mounted to the table 11 (not shown) by chuck jaws 51 and 52 and being machined by a tool 53. The depth of cut (DOC) is the dimension of the cut in the radial or X direction, and the tool 53 is fed at the rate (IPR) in the minus Z direction.

The cut or more precisely the programmed machining path 54 is tapered between an initial point (G) and a final point (H). Along the tapered portion of the machining path 54, which is programmed as a single machining move, the depth of cut is assumed to be a linear function according to:

$$DOC(x,z) = (DOC_h - DOC_g)(DIST/LCUT) + DOC_g \quad \text{(Equation 13)}$$

where $$LCUT = \sqrt{(X_g - X_h)^2 + (Z_g - Z_h)^2}$$

$$DIST = \sqrt{(X_g - X)^2 + (Z_g - Z)^2}$$

and where ($DOC_h$) is the programmed depth of cut at the end of the tapered cut, ($DOC_g$) is the programmed depth of cut at the beginning of the tapered cut, ($x_g$, $z_g$) are the coordinates of the initial point (G) for the tapered cut, and ($x_h$, $z_h$) are the coordinates of the final point (H) of the tapered cut.

Also shown in FIG. 4 are a beginning distance (B) and an ending distance (E) which may be programmed for any machining move in order to inhibit the tool worn or tool broken trigger signals before the tool 53 engages the workpiece 50, or just before the tool disengages the workpiece, respectively. For part programming simplicity these distances (B), (E) are referenced to the respective initial or final points of their respective cuts, as shown in FIG. 4. Alternatively, the actual engagement or disengagement of the tool from the workpiece could be sensed. The engagement of the tool with the workpiece can be sensed by monitoring the horsepower constant (KHP) without interference or conflict with monitoring the horsepower constant for tool wear or tool breakage. In this alternative, when a beginning distance (B) is programmed for a cut, the tool wear and tool breakage trigger signals are inhibited until contact between the tool and the workpiece is sensed by the calculated horsepower constant ($KHP_c$) exceeding the lower breakage limit (L). The trigger signals are thereafter inhibited for the beginning distance (B) in order to prevent triggering due to the workpiece surface being rough or the workpiece being out-of-round which could cause the calculated horsepower constant to fluctuate above and below the lower breakage limit.

Figure 5:
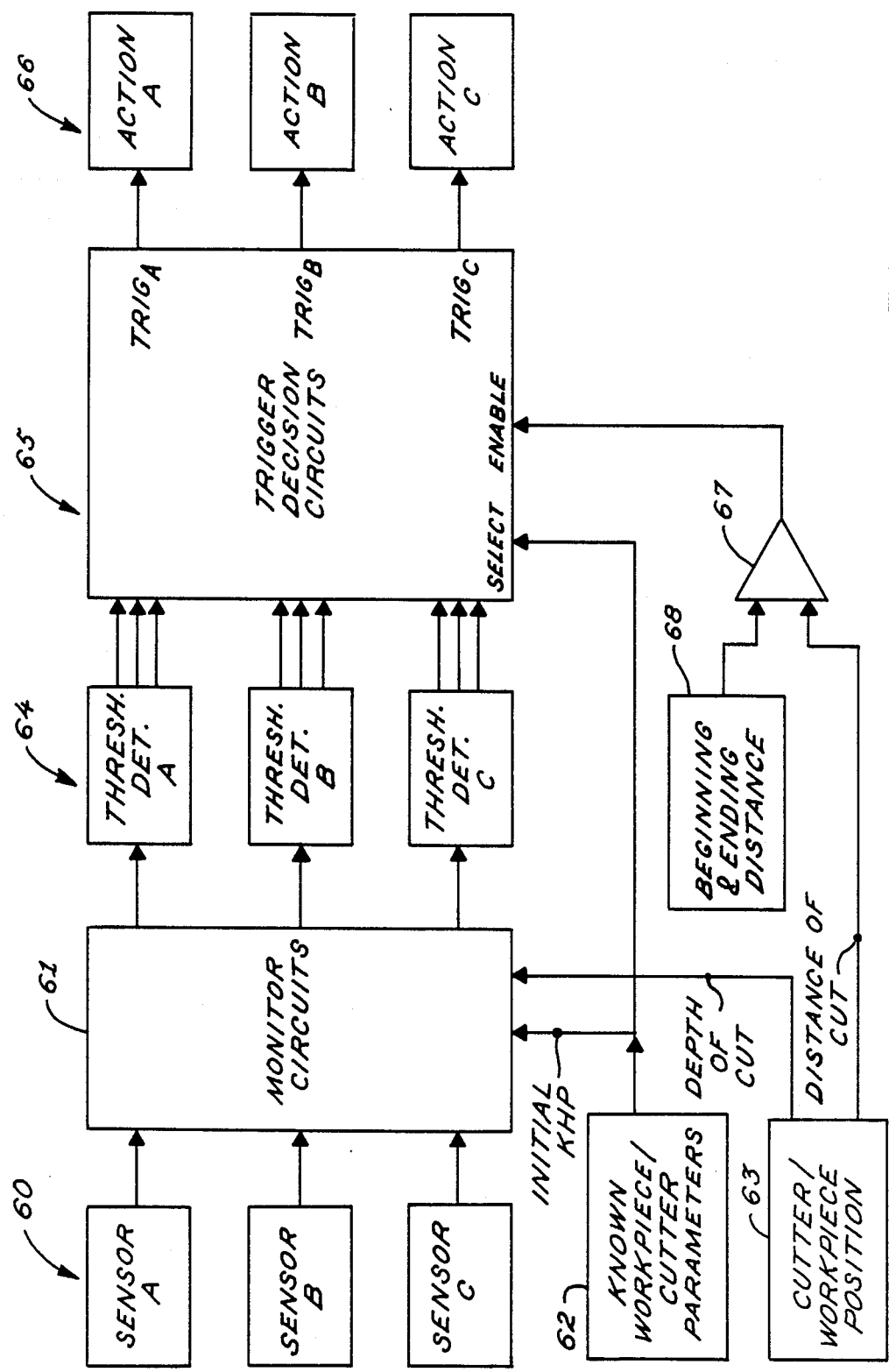
FIG. 5 is a block diagram showing in a very general manner the signal processing for performing the tool retract function according to an important aspect of the present invention.

Turning now to FIG. 5, there is shown a schematic diagram of the signal flow through the preferred tool monitoring system employing the present invention. Any number of sensors generally designated 60 may be used to monitor the degradation of the tool. Sensing of the gross power fed to the spindle drive motor has already been discussed, from which the cut horsepower ($HP_c$) and horsepower constant (KHP) may be derived by the "monitor circuits" 61. Other sensors and signals that can be monitored include the time that the cutting tool is in a cut, the temperature of the tool as detected, for example, by an infrared sensor; vibration analysis as detected, for example, by an accelerometer or acoustical sensor; and in-process gaging of the tool for dimensional wear. As discussed above in connection with calculation of the horsepower constant ($KHP_c$) and the unit power ratio (UPR), monitoring of the sensor signals may take into account known workpiece/cutter parameters 62 and the relative position 63 between the cutter or tool and the workpiece. In the example above, the known workpiece/cutter parameter was the initial horsepower constant ($KHP_c$) or a programmed horsepower constant ($KHP_p$).

The monitored signals derived by the monitor circuits 61 are fed to respective threshold detectors generally designated 64 to generate limit signals which are monitored by trigger decision circuits generally designated 65 which may generate respective trigger signals to trigger respective actions generally designated 66. The trigger decision circuits respond to a priority ordering of the limit signals and the trigger signals may be further selected or enabled in response to the known workpiece/cutter parameters 62. As described above, particular ones of these trigger signals may be enabled in response to a comparator 67 comparing the relative cutter/workpiece position 63 as indicated, for example, by the distance through a programmed cut, to the programmed beginning and ending distances 68. The trigger decision circuits 65 may incorporate a time delay between the detection of a limit condition and the generation of a responsive action. In particular, a trigger signal for changing a worn tool or worn insert may be generated in response to a tool wear limit signal only after the cut is completed and a rapid traverse or "air cut" command in the part program is executed. Moreover, the trigger decision circuits may generate a trigger signal for a particular action only upon the occurrence of multiple limit signals. An action, for example, could be conditionally executed when the feed force is above a limit force and the horsepower constant is above a respective limit. Furthermore, a trigger signal could be specified by a conditional expression, for example using Boolean arithmetic. An action could be triggered, for example, when the feed force is above a force limit AND cut horsepower is above a limit OR the acoustic emission level is above a limit AND the elapsed time during which the cut horsepower has exceeded a certain level is above a time limit. A specific method for programmer specification of conditional expressions for selected trigger signals will be discussed below.

The actions 66 may include any number of responses such as error messages, a "feed hold", a "master stop", an "emergency stop", "secondary retract moves", "retract during cut", "retract at end of block", "retract on next rapid traverse", "feed resume", "tool change with equivalent tool", "insert change", "load new tool", "remove or scrap workpiece", and "load new workpiece". Specific examples of these responses will be further described below.

It should be noted that the signal processing circuits in FIG. 5 are implemented by programming the numerical control computer 33 (FIG. 1). For each signal processed by these circuits there is a corresponding parameter or program variable in the control program for the numerical control computer. To a large degree the signal processing functions are user defined or programmable, for example, by including predetermined functions or codes in the part program. The functions or codes, for example, preferably conform to the EIA standards RS-274-D and RS-447 established by the Electronic Industries Association, 2001 Eye St., Northwest, Washington, D.C. 20006. The predefined codes and functions preferably include both "Type 1" and "Type 2" data as defined in the RS-447 standard. Type 1 data include the classical machine program data according to the RS-274-D and RS-358-A standards. Type 2 data include set-up data or operator messages according to the RS-447 standard and the USAS X3.4-1968 standard. In a part program following these standard conventions, the Type 2 data or instructions are enclosed in parentheses to distinguish them from the Type 1 data or instructions.

According to an exemplary embodiment, it has been found useful to define a number of Type 1 data instructions. The code M70 is a non-modal code provided for inhibiting tool wear and breakage limit sensing. As is well known, a "non-modal" code is operative only for the particular machine program block in which it is included, in contrast to a modal command which applies to the programming block which includes the command and any following blocks which do not include a corresponding non-modal code up to the first block including a corresponding modal code. The modal code M71 is provided to turn on the sensing of limits responsive to the horsepower constant, except when inhibited by a G00 code or rapid positioning function until being reenabled by a G01 or feed break positioning code. A modal code M72 enables the calculation of the horsepower constant ($KHP_c$) and the unit power ratio (UPR), but inhibits the limit signals.

It is also desirable to provide a number of Type 2 data codes recognized as parameters in a definitional Type 2 function named "TDM" having the following format:

(TDM, [Type 2 data code list])

The Type 2 data codes are identified by an alphabetic letter designating a user-programmable parameter followed by a value for the parameter selected by the part programmer. In the following descriptions of the Type 2 data codes, the alphabetic letter is followed by two numbers separated by a decimal point. The number to the left of the decimal point designates the maximum number of digits for the value selected for the parameter of the code or function identified by the alphabetic letter. The number to the right of the decimal point denotes the maximum allowable number of digits to the right of the decimal point for specifying this parameter.

In order to program the beginning distance (B) and the ending distance (E) as shown in FIG. 4, respective Type 2 codes B4.4 and E4.4 provided to select in modal fashion the incremental vector path distance that the axes are moved before the tool degradation monitor is enabled and the incremental path distance from the end of the path where the tool degradation monitor is disabled.

Preferably, when consecutive feed rate moves such as moves commanded by the G01 command occur, the specified beginning distance (B) applies only to the first such move, and the specified ending distance (E) applies only to the last such move; provided, however, if the Type 2 code is specified for a particular feed rate move, the code should apply to that move regardless of the preceding or following move. During interpretation or execution of the part program, for example, the modal Type 2 codes B4.4 and E4.4 set respective memory locations (which preferably are initially cleared at the start of the part program). When the tool degradation monitor, as further described below, checks whether the limit conditions should be tested for a current feed rate move, it obtains the values stored in the respective memory locations; but if the previous move was also a feed rate move, a beginning distance was not specified in the current move, and an ending distance was not specified in the previous move, the value obtained for the beginning distance (B) is set to zero; and similarly if the next move is also a feed rate move, an ending distance was not specified in the current move, and a beginning distance is not specified in the next move, the value obtained for the ending distance is set to zero. By the use of this procedure the part programmer does not need to explicitly specify a beginning and ending distance for each cut, and special cases can be taken care of in a way that is natural and readily apparent from the part program.

To specify the depth of cut at the beginning and ending points of a cut, the Type 2 codes A1.4 and Z1.4, respectively, specify values corresponding to ($DOC_g$) and ($DOC_h$), respectively, in modal fashion. For two consecutive feed rate commands, however, the beginning depth of cut is set equal to the previous ending depth of cut, and if the ending depth of cut is not programmed, it is set equal to the beginning depth of cut.

To set the programmed horsepower constant ($KHP_p$) in modal fashion, a code Type 2 code K2.2 is provided. Also, if this code is not used, then the horsepower constant ($KHP_p$) is set to the horsepower constant ($KHP_c$) that is calculated in the first feed rate move after the first beginning distance (B) for that move.

Separate Type 2 codes are provided to set the tool wear limit and the lower and upper breakage limits, as illustrated in FIG. 2C. The code W3.2 sets the unit power ratio wear limit (W %) in modal fashion. When set, if the average unit power ratio (UPR %) is greater than the limit (W %) then a user-defined wear limit interrupt subroutine is executed, as further described below. The code L3.2 sets the unit power ratio lower breakage limit (L %) in modal fashion. When set, if the instantaneous unit power ratio (UPR %) is less than the limit (L %), then a user-defined breakage limit interrupt subroutine is executed, as further described below. Similarly, a code U3.2 sets the unit power ratio upper breakage limit (U %) in modal fashion. When set, if the instantaneous unit power ratio (UPR %) is greater than the limit (U %), then the breakage limit interrupt subroutine is executed.

The user-defined interrupt subroutines are preferably written in the EIA Standard RS-447 and RS-274-D format in the same fashion as the part program itself. To facilitate the programming of such subroutines, preferably the user is provided with a number of predefined internal subroutines or functions for performing specific actions or steps related to correcting for the excessive tool wear or the tool breakage conditions. A function, for example, could be provided to display a programmer-defined error message on the display 39 of the operator station 38 (see FIG. 1). A "FEED HOLD" function should be defined to stop all axis motion. Similarly, a function "MASTER STOP" should be defined to stop all axis motion and also all table or spindle motion. A function "RETRACT" should be defined to safely retract or disengage the tool from the workpiece along a user-specified path of incremental (X,Z) moves. The coordinates of the initial points for all of these moves should be saved, starting from the "departure point" at which the tool is disengaged from the work piece. These saved coordinates are used to reverse-retrace the prior path of the tool.

Figure 6:
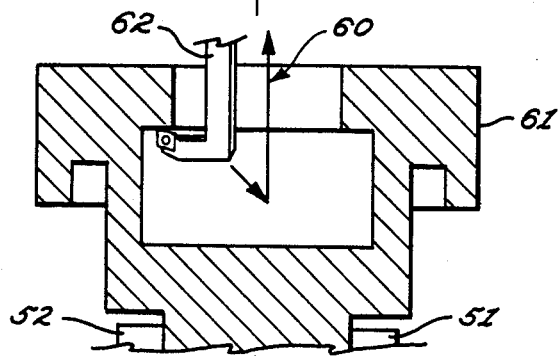
FIG. 6 is a schematic diagram showing an internal machining operation performed by the vertical machining center of FIG. 1 and illustrating a safe retract path for the tool.

As shown in FIG. 6, the retract path generally designated 60 must be responsive to the particular cut or block in the part program which is interrupted in response to the trigger signal. Specifically, FIG. 6 shows the internal machining of a workpiece 61 with a special tool 62 provided for internal machining. In this particular example, the cutter is not moved away from the workpiece in the normal sense; rather, safe retraction requires the cutter to be moved towards the center of the workpiece before the tool and cutter 62 can be moved away from the workpiece in the positive Z direction of the spindle axis.

Figure 7:
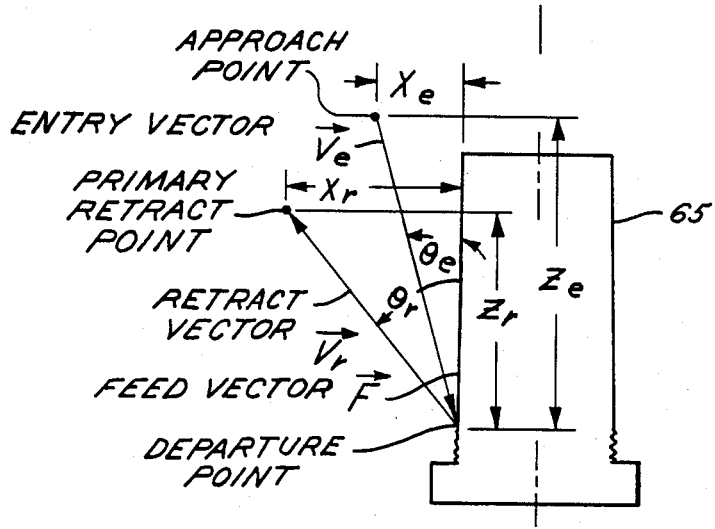
FIG. 7 is a schematic diagram illustrating the definitions of the entry and retract vectors for the safe retract procedure according to an important aspect of the present invention.

According to an important aspect of the present invention, specific functions are provided for specifying in relative polar coordinates an initial retract vector and an entry vector, as shown in FIG. 7 for an external turning operation upon a workpiece 65. The tool (not shown) is fed along a feed vector (F) which follows the machining path defined by the part program. Upon interrupt of the machining path at the departure point, the cutting tool is incrementally withdrawn along a retract vector ($V_r$) specified by an angle ($\theta_r$) relative to the machining path. In particular, the retract angle ($\theta_r$) is an acute angle with respect to the reverse of the feed direction specified by the feed vector (F). By defining the retract vector relative to the machining path in modal fashion, the relative angle ($\theta_r$) is automatically adjusted along each segment of a piecewise linear path. Similarly, for a curved path such as provided by circular interpolation, the retract vector is continuously adjusted during the cut or part program block.

During retraction along the retract vector, the cutting tool is moved from the departure point to a primary retract point, from which the tool is further retracted for insert change or tool change.

In accordance with another important aspect of the present invention, upon returning to the workpiece, the cutter is moved to an approach point defining an entry vector making an acute grazing angle with respect to the workpiece. The cutting tool is reengaged by being moved from the approach point along the entry vector to the departure point without remachining the workpiece. This procedure results in a minimum of surface damage to the workpiece 65 in the region of the departure point. In addition, the entry vector ($V_e$) is defined by an angle ($\theta_e$) relative to the direction of the machining path. As shown, the entry angle ($\theta_e$) is defined with respect to the reverse direction of the feed vector (F) Since the entry angle ($\theta_e$) is an acute grazing angle, defining the entry vector relative to the machining path is particularly advantageous for curved cuts in which the direction of the machining path over the cut may substantially change or even exceed the magnitude of the entry angle ($\theta_e$).

It should be noted that the retract angle ($\theta_r$) and the entry angle ($\theta_e$) are both signed quantities, defined in the standard fashion wherein a positive angle denotes the respective retract or approach vector being angularly displaced counterclockwise from the reverse direction of the feed vector (F). It is important to note that in some cases the sign of the angles must be negative rather than positive in order to avoid collision between the workpiece and tool. The sign of the angle changes, for example, depending upon whether machining occurs in the positive or negative X direction or the positive or negative Z direction, and also depending upon whether an internal or external machining operation is being performed.

Figure 8:
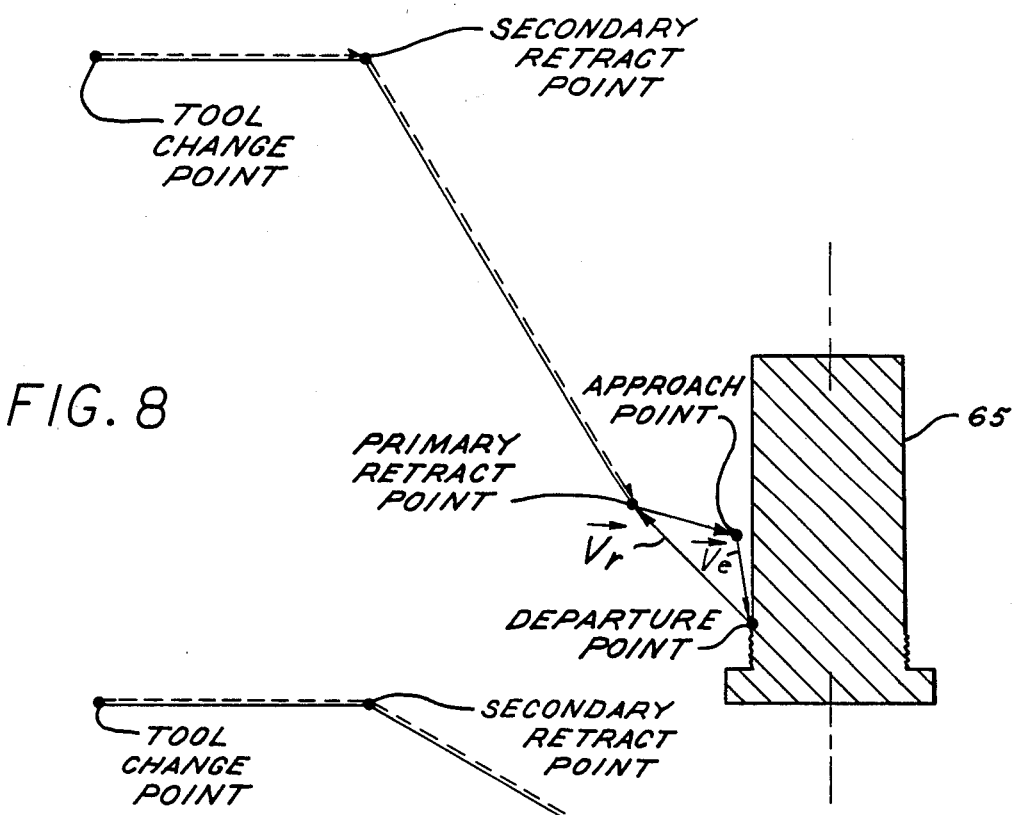
FIG. 8 is a schematic diagram illustrating a safe retract path from a departure point to a tool change point used during an external turning operation.

Turning now to FIG. 8, there is shown the preferred method of retracting the tool from the workpiece to a tool change point and thereafter reengaging the tool with the workpiece. Upon the occurrence of a tool wear or tool breakage signal, the part program is interrupted and the numerical control computer computes the retract vector ($V_r$) and moves the tool to the primary retract point free and clear of the workpiece 65. Then, the tool is moved directly to a secondary retract point. From the secondary retract point, the tool change point can be reached in a single move. The retract path from the primary retract point to the tool change point is stored in memory. At the tool change point, the cutter or tool is changed. By reverse-retracing the stored retract path, the changed tool is returned first to the secondary retract point and then to the primary retract point. Upon reaching the primary retract point, the approach point is calculated by subtracting the components of the entry vector ($V_e$) from the coordinates of the departure point. By using a direct move operation (absolute coordinates), the tool is moved to the coordinates of the approach point and thereafter moved along the entry vector to the departure point.

Figure 9:
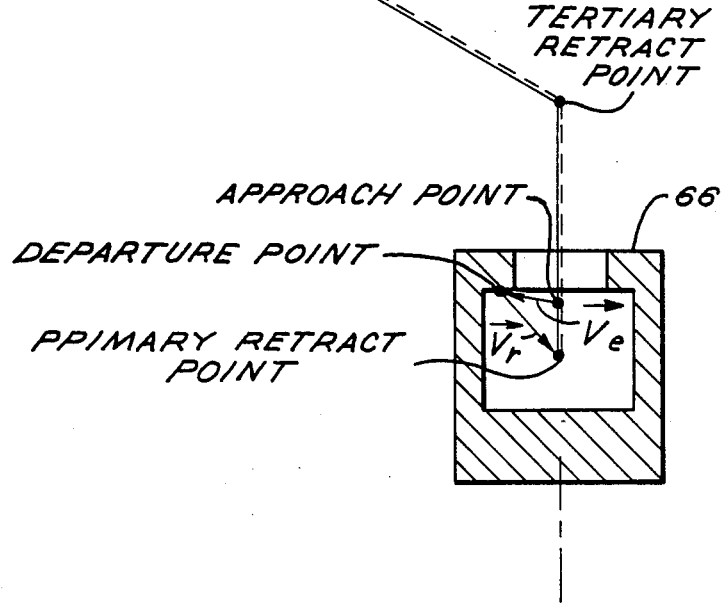
FIG. 9 is a schematic diagram of a safe retract path from a departure point to a tool change point used during an internal machining operation.

As shown in FIG. 9, safe retraction of a tool during an internal machining operation may require additional retract moves. In response to a trigger signal, the tool is retracted to the primary retract point near the center of the workpiece 66. Thereafter the tool is moved in the positive Z or spindle axis direction to a tertiary retract point. From the tertiary retract point, the secondary retract point is reached by a direct move operation. After moving to the tool change point and changing the tool, the retract path is reverse-retraced back to the primary retract point. In the particular example of FIG. 9, the approach point happens to lie on the path between the primary retract point and the tertiary retract point. Therefore, upon returning to the primary retract point, the motion of the tool is reversed to reach the approach point. Reengagement of the tool and the workpiece 66 results from a direct move along the entry vector ($V_e$) to the departure point.

As described above, the programmer includes definitional functions in the part program for setting up the sensing of limits and enabling various trigger signals. Also, the programmer writes interrupt subroutines for performing selected actions in response to respective ones of the trigger signals. The actual implementation of these definitional functions and the execution of the retract and entry procedures illustrated in FIGS. 7, 8 and 9 require modification of the basic control program executed by the numerical control computer during the interpretation or execution of the part program.

Figure 10:
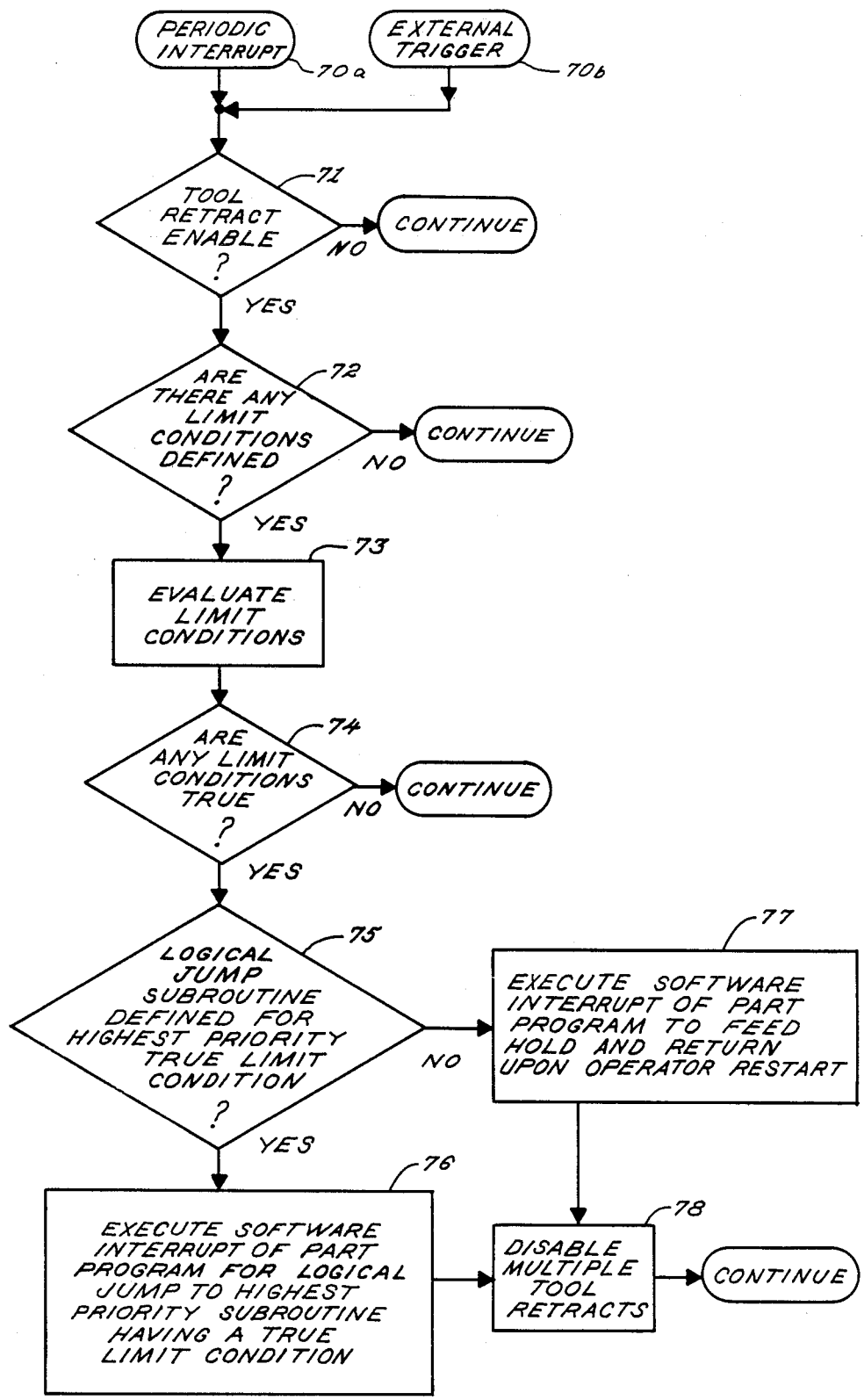
FIG. 10 is a flowchart of an interrupt sequence included as part of the internal control program of the numerical control unit and executed periodically or in response to an external trigger in order to test for the occurrence of a limit condition, and upon finding a limit condition satisfied, executing a logical jump from the current block of a part program to a tool retract program.

A flowchart of a typical interrupt procedure generally designated 70 is shown in FIG. 10. This procedure could be executed in response to a periodic interrupt signal 70a, for example, generated by a hardware interrupt timer, or in response to an external trigger signal 70b from an independent sensor such as one of the sensors 60 in FIG. 5. The procedure is executed in response to a periodic interrupt, for example, each time a new value of the horsepower constant (KHP) is calculated as described above. In a first step 71, a logical flag, switch or timer is tested to determine whether the tool retract function is enabled. If not, the evaluation of limit conditions for generating trigger signals is bypassed. It has been mentioned that the tool retract function may be disabled for a beginning distance (B) of a cut to ensure that the tool is entirely engaged with the workpiece before certain tool wear and breakage trigger signals are enabled. The distance traveled through the cut (DIST) from Equation 13 is compared to the beginning distance (B) obtained from memory as described above, and similarly the distance from the end of the cut (LCUT-DIST) is compared to the ending distance (E) to determine whether the tool breakage and tool wear limit conditions should be enabled or inhibited on this basis. Tool retraction is also disabled when the tool has already been retracted from the workpiece along the retract vector ($V_r$). This is necessary to prevent multiple interrupts of the part program from occurring during the tool retraction process. It may also be desirable to disable the tool retraction for a very short time after reengagement along the entry vector ($V_e$) in order for equilibrium machining conditions to be re-established before tool retraction is reenabled. For this purpose, in step 71, a timer or counter could be set to zero to disable tool retraction, set to a predetermined number N to enable tool retraction, and set to some number greater than zero but less than N to enable tool retraction only after a predetermined number of periodic interrupts. In step 71, for example, the value of this counter is compared to zero, and tool retract is immediately bypassed if the value is equal to zero. Otherwise, the value of the counter is incremented and then compared to the predetermined number N. If the value of the counter at that time exceeds the value N, the value of the counter is set to N and execution continues in step 72. In other words, by setting the value of the counter to a value between one and N, tool retraction will be enabled on a delayed basis after a selected number of periodic interrupts.

In the next step 72 the numerical control procedure searches a certain region of memory to determine whether there are any limit conditions defined. As noted above, specific definitional Type 2 data commands may be inserted into the part program to define these limits. When a definitional subroutine is found, the limit is identified or flagged in memory.

Figures 11, 12:
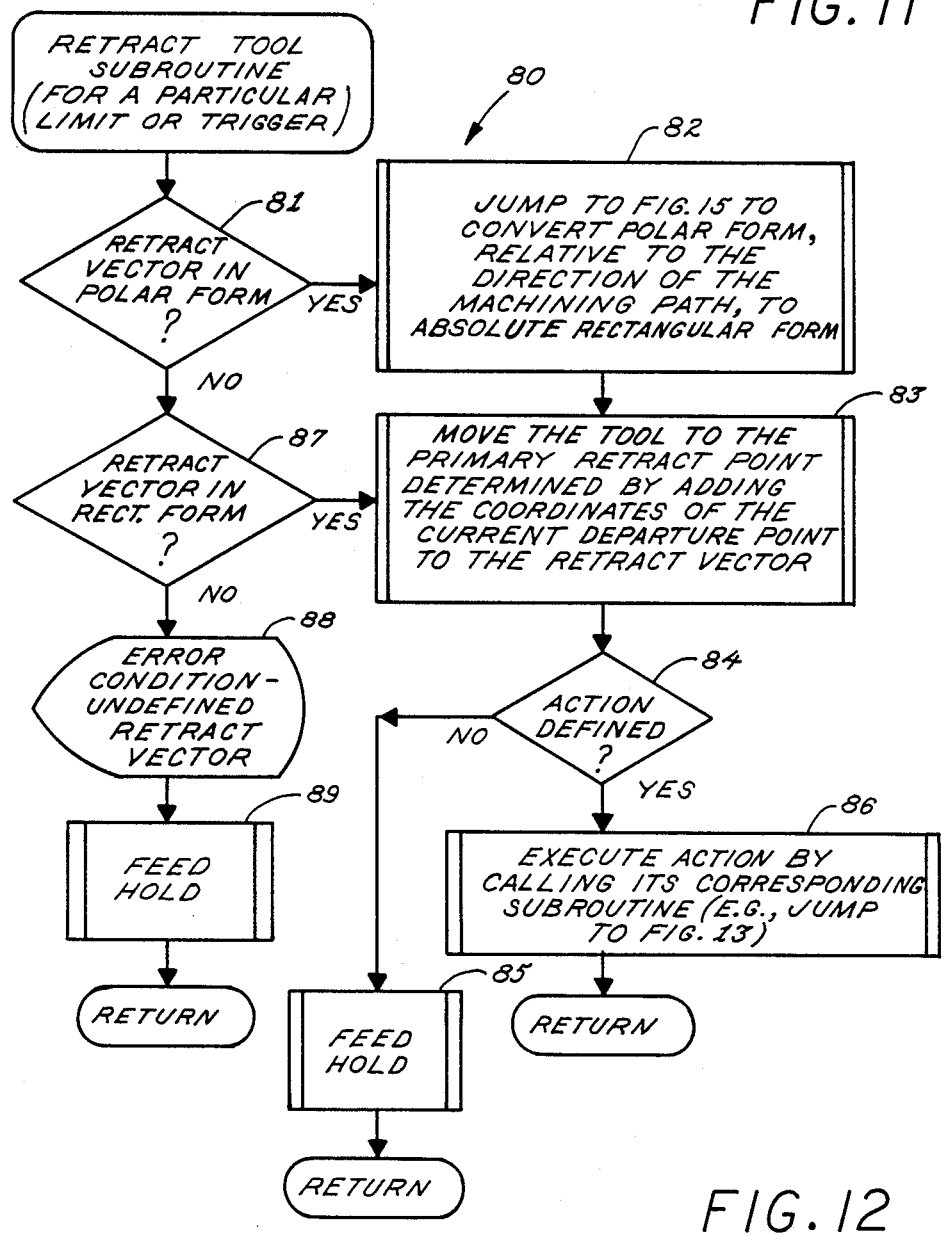
FIG. 11 is a parameter table referenced by the periodic interrupt sequence of FIG. 10 to perform the tool monitoring functions.
FIG. 12 is a flowchart of a retract tool subroutine for retracting the tool to a programmed primary retract point when a particular limit condition or trigger signal is detected by the interrupt sequence of FIG. 10.

A particularly flexible way of setting up the limits is to define a tool monitor parameter table as shown in FIG. 11. Whenever a limit is defined, a name for the limit is inserted into the next successive entry of the limit column of the table. Also, the position of the name of the limit identifies its priority. In step 72, for example, the numerical control computer searches the limit column of the tool monitor parameter table for some name that is not equal to "NIL" denoting an erasure from the table, or "EOF" denoting the end of file or in this case the end of the tool monitor parameter table. The tool monitor function is bypassed if there are not any limit conditions defined. Otherwise, in step 73 of FIG. 10 the limit conditions are evaluated. The limit conditions could be defined in terms of Boolean functions relating specified parameters to specified limits. As shown in the tool monitor parameter table of FIG. 11, a high priority maximum horsepower limit named "HPMAX" is defined by the Boolean condition "AVHP.GT.75" which says that the limit HPMAX is reached when the average horsepower exceeds a value of 75. Such a condition relating a parameter to a value by a relational operator is the simplest term possible in a Boolean expression involving non-Boolean parameters. Such terms may be linked with other terms or Boolean parameters by the Boolean connectors such as "NOT", "AND", and "OR".

For explicitly defining limits, the following Type 2 definitional functions could be defined for insertion into the part program:

(DEF, NAME—OF—LIMIT, CONDITION)

(DEL, NAME—OF—LIMIT)

where the DEF function inserts the name of the limit and its associated condition into the tool monitor parameter table of FIG. 11, and wherein the DEL function erases the limit and respective condition from the table. These definitional functions could be useful for experimental purposes, and once a certain limit has been found to be particularly useful, such a limit could be internally defined. When the limit is internally defined, the programmer may assume that the limit is placed in the table.

Since the limit conditions are ranked in the tool monitor parameter table according to their priority, step 73 in FIG. 10 for evaluating limit conditions involves successively interpreting the conditions in the tool monitor table until one is found to be true as specified in step 74 of FIG. 10. If all of the limit conditions fail, then the rest of the tool monitor procedure of the periodic interrupt is bypassed. Otherwise, in step 75, the numerical control program searches the tool monitor parameter table to determine whether an interrupt subroutine is defined for the highest priority true limit condition.

The tool monitor parameter table of FIG. 11 is set up to store parameters for three types of subroutines that may be associated with a particular limit. Since the first thing that may occur upon detection of a true limit condition is a retract from the workpiece, a particular column of the tool monitor parameter table is set aside for storing ENR parameters which specify the retract vector ($V_r$) and what to do after the primary retract point is reached. In a specific embodiment corresponding to the tool monitor parameter table of FIG. 11, the ENR parameters are loaded into the parameter table upon execution of the following Type 2 subroutine in the part program:

(ENR, NAME_OF_LIMIT, R5.3 T3.3 Pn)

The code R5.3 specifies the length or magnitude of the retract vector, the code T3.3 specifies the retract angle ($\theta_r$), and the code Pn specifies the action to perform once the tool is retracted to the primary retract point. Instead of specifying the relative polar coordinates of the retract vector, the codes X5.3 and Z5.3 could be used to specify the absolute components $X_r$ and $Z_r$ of the retract vector as shown in FIG. 7. (For machine tools having more than two axes, an optional code such as W5.3 may specify a component of the retract vector along a third axis perpendicular to the presently defined machining plane.) The action of P0 or P not programmed specifies the default action, which is a feed hold. The code P1 specifies a master stop to occur after the retract. The code P2 generally specifies that an enabled subroutine and/or an enlabled entry command should be performed as more specifically described below in Appendix II.

Once an enabled subroutine has been defined, the name of the enabled subroutine will appear in the ENS column of the tool monitor parameter table. Similarly, if an enabled entry command has been defined, then the entry will be specified in the ENE column of the table.

The following Type 2 subroutine may be included in the part program to enable a subroutine:

(ENS, NAME_OF_LIMIT,
NAME_OF_SUBROUTINE; PE, PE, . . . )

where PE represents any valid parameter expression which may optionally be passed to the defined interrupt subroutine.

Similarly, the following Type 2 subroutine is provided to allow the part programmer to define the enry action:

(ENE, NAME_OF_LIMIT, R5.3 T3.3 Pn)

The code R5.3 denotes the length or magnitude of the entry vector, the code T3.3 represents the relative angle ($\theta_e$) of the entry vector, and the code Pn represents an action to take once the tool has been moved to the approach point. (For machine tools having more than two axes, an optional code such as W5.3 may specify a component of the retract vector along a third axis perpendicular to the presently defined machining plane.) It should be noted that the first step in performing the reentry procedure is to move the tool from its current location, which is preferably the primary retract point, directly to the approach point so that the tool can thereafter be moved along the selected and programmed entry vector back to the departure point.

To erase the parameters from the ENR, ENS, or ENE column of the tool monitor parameter table for a selected limit, the following Type 2 codes may be included in the part program:

(DSR, NAME_OF_LIMIT)

(DSS, NAME_OF_LIMIT)

(DSE, NAME_OF_LIMIT)

where DSR cancels the "retract enable" for the specified limit, DSS cancels the "subroutine enable" for the specified limit, and DSE cancels the "entry enable" for the particular limit.

A wide variety of actions may be selected by the part programmer through judicious choice of the ENR, ENS, and ENE parameters. The actions occurring for the possible combinations are tabulated and summarized in Appendix II.

Returning to the periodic interrupt flowchart 70 of FIG. 10, if in step 75 a logical jump subroutine is defined for the highest priority true limit condition, then in step 76 a software interrupt of the part program is executed for a logical jump to the highest priority subroutine having a true limit condition. As described above, tool retraction has first priority, the user defined subroutine has second priority, and tool reentry has third priority. It should be noted that in step 76 execution by the numerical control computer does not jump directly to any of these three subroutines. Instead, certain pointers pointing to the current step in the part program are stored in memory and replaced with pointers pointing to the first step in the highest priority subroutine, or for the specific example represented by the table of FIG. 11 and described below, to the first step in the ENR subroutine (for example step 81 in FIG. 12 as described below). In addition to storing these pointers, several parameters used by the part program are also stored so that they will be available for resumption of the part program. These parameters include the end point coordinates of the interrupted cut, the departure point, the distance from the beginning point to the ending point of the cut for each axis (called the axis vector distance), the ratio of the axis vector distance to the total path length, all modal data including the standard M and G codes, feeds and speeds, the limiting velocity value for the present block, and for circular interpolation the radius of the circle is also saved.

If in step 75 a logical jump subroutine was not defined for the highest priority true limit condition, then in step 77 a software interrupt of the part program is performed to feed hold and return to the part program upon operator restart.

The final step 78 of the periodic interrupt procedure 70 shown in FIG. 10 is to disable multiple tool retracts. The logical flag, switch or timer tested in step 71 is set off in order to prevent successive software interrupts by step 76 or 77 in the interrupt procedure.

Turning now to FIG. 12, there is shown a flowchart generally designated 80 of an internal retract tool subroutine. The internal retract tool subroutine is a high-level subroutine inserted in the control program of the numerical control computer, and is executed in lieu of the part program after a software interrupt is set up or executed in step 76 of the periodic interrupt procedure 70 of FIG. 10. In the first step 81 of the retract tool subroutine, the numerical control computer checks the entry in the ENR column of the tool monitor parameter table for the respective limit which caused the interruption of the part program. If a retract vector is not specified in that particular table entry, the computer looks upwardly in the ENR column for the specification of a retract vector expressly defined for another limit. If a retract vector is specified in polar form, then in step 82 the polar form, relative to the direction of the machining path, is converted to absolute rectangular form by calling a subroutine shown in FIG. 15. Then, in step 83, the coordinates of the primary retract point are determined by adding the coordinates of the current departure point to the respective components of the retract vector, and a direct move subroutine is called to rapidly move the tool to the primary retract point. Next, in step 84, the numerical control computer again checks the entry of the ENR column of the tool monitor parameter table for the respective limit to determine whether an action is defined by a Pn parameter. If not, then in step 85 a default feed hold is executed. Otherwise, in step 86, the action specified by the Pn parameter is executed by calling its corresponding subroutine.

Returning for a moment to step 81, if the retract vector is not in polar form, then in step 87 the ENR parameters are checked to determine whether the retract vector is in rectangular form. If so, then execution jumps to step 83 to retract the tool. Otherwise, no retract vector has been properly defined so that an error message is displayed in step 88, and a feed hold is executed in step 89.

Figure 13:
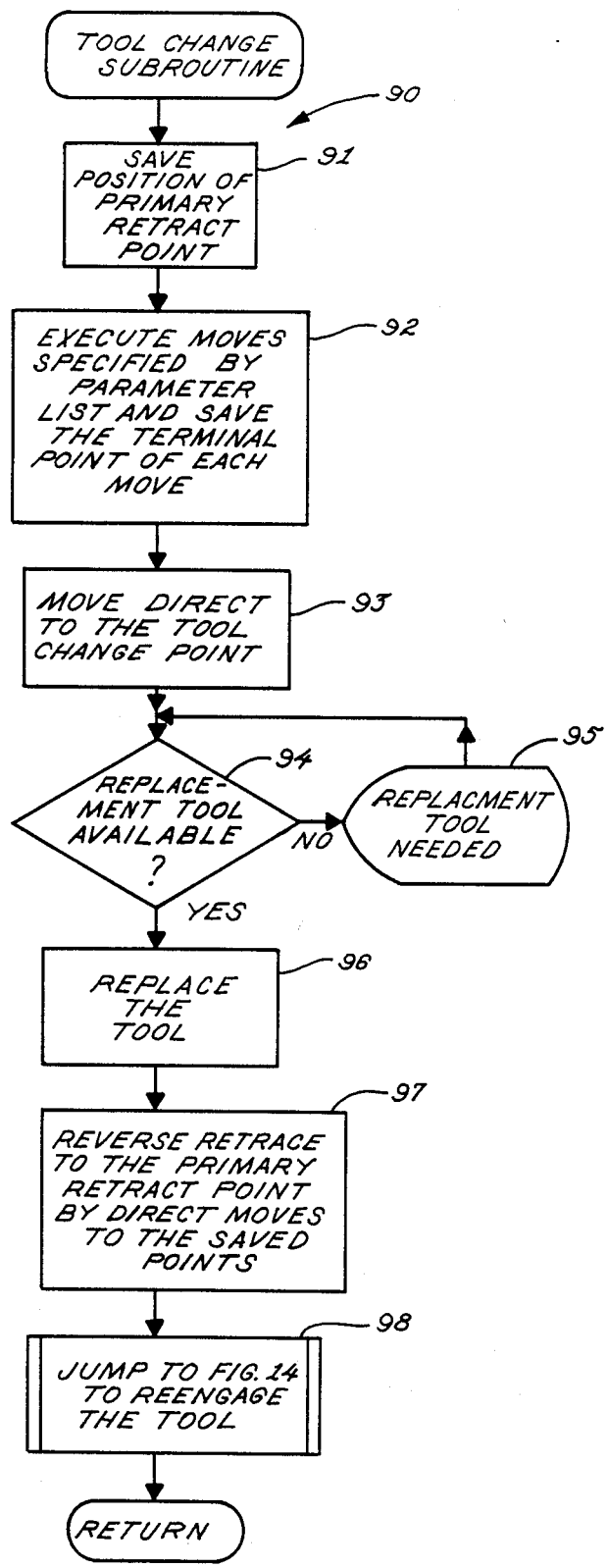
FIG. 13 is a flowchart of a tool change subroutine for moving the tool from the primary retract point to the tool change point, and returning and reengaging the changed tool with the workpiece.

The corresponding subroutine called in step 86 is typically a user-defined subroutine such as a tool change subroutine. Shown in FIG. 13 is a typical flowchart generally designated 90 of a tool change subroutine. In the first step 91 the coordinates of the primary retract point are saved in memory. Then in step 92 a series of moves are executed as specified by the parameters (including a designation of rapid traverse rate) in the subroutine's parameter list, and the terminal point of each move is saved in memory. Next in step 93 a direct move is made to the tool change point.

In step 94 the numerical control computer checks whether a replacement tool is available, and if not, an error message is displayed in step 95 until a replacement tool becomes available. When the replacement tool is available the original tool is replaced in step 96. In other words, the automatic tool changer is commanded to execute a normal operational cycle, with the replacement tool called for being one identical to the original tool. Then in step 97 the changed tool is moved to the primary retract point by reverse retracing using a series of direct moves to the respective coordinates saved in memory. Upon reaching the primary retract point, in step 98, a reengage tool subroutine is called.

Figure 14:
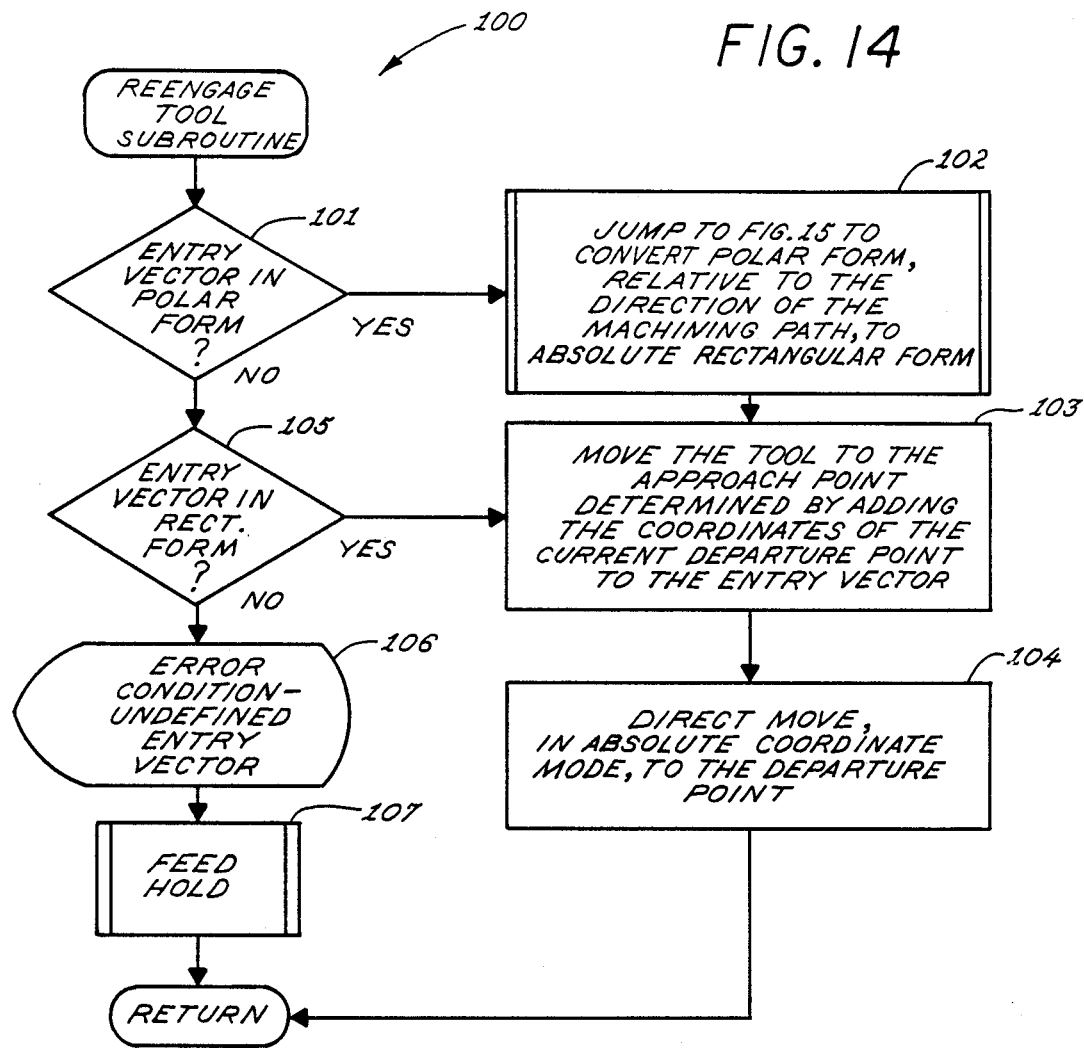
FIG. 14 is a flowchart of a reengage tool subroutine used for engaging the changed tool with the workpiece along a programmed entry vector.
Figure 15:
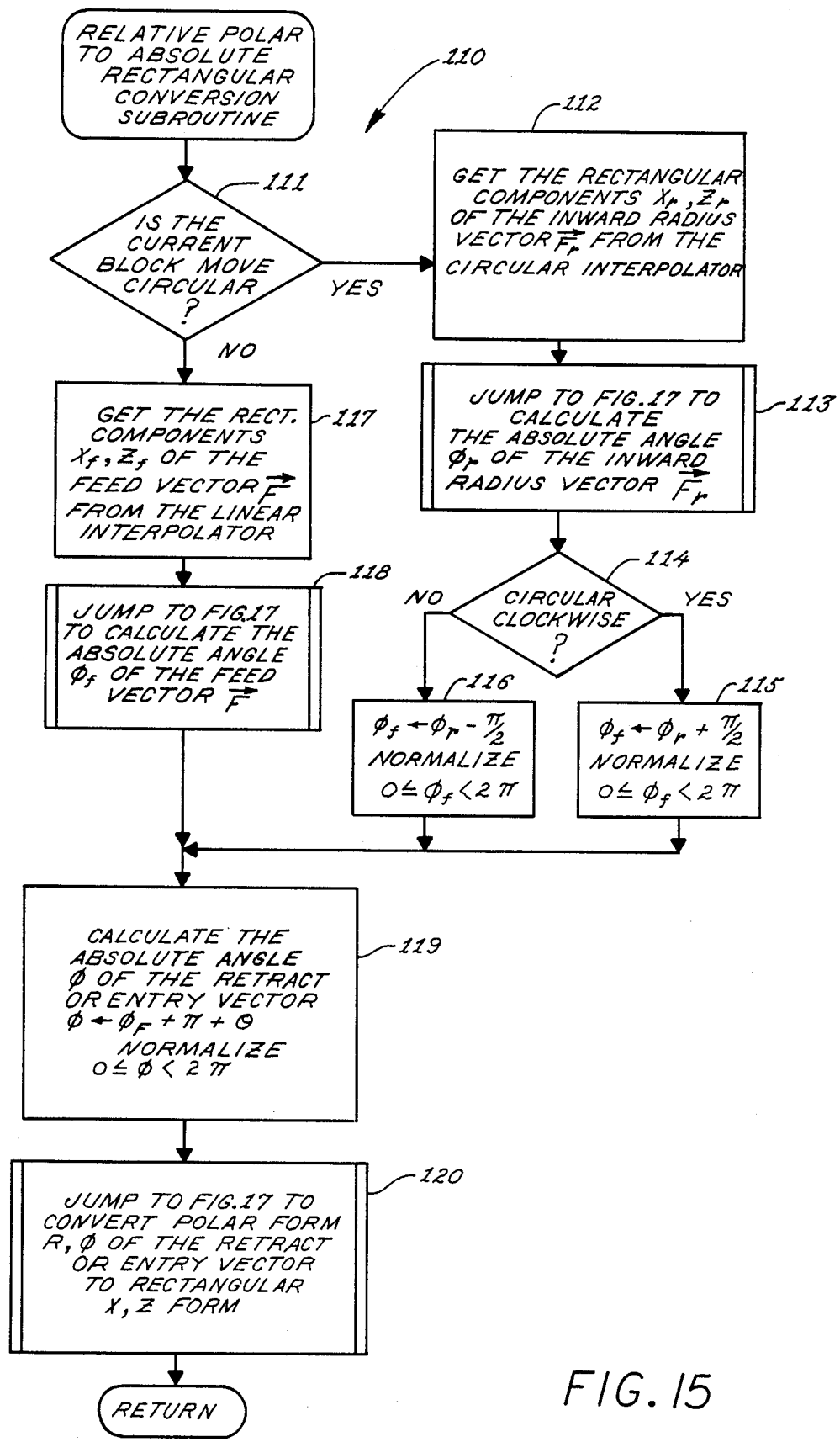
FIG. 15 is a flowchart of a subroutine for converting the polar specification of a retract or entry vector, relative to the direction of machining, to an absolute rectangular representation.

Turning now to FIG. 14, there is shown a flowchart generally designated 100 of the reengage tool subroutine. This subroutine is a high-level subroutine inserted in the control program of the numerical control computer 33 of FIG. 1. In the first step 101 the ENE column of the tool monitor parameter table of FIG. 11 is addressed to obtain the ENE parameters for the respective limit, and the parameters are checked to determine if the entry vector is in polar form. If so, then in step 102 the subroutine shown in FIG. 15 is called to convert the polar specification of the entry vector, relative to the direction of the machining path, to absolute rectangular form. Next in step 103 the coordinates of the approach point are determined by adding the coordinates of the current departure point to the respective components of the entry vector. Therefore, a direct move (in absolute coordinate mode) can be made in step 104 to the departure point.

If the entry vector is not in polar form, then in step 105 the ENE parameters are checked to determine whether the entry vector is in rectangular form. If so, then execution jumps to step 103. If not, then the entry vector is undefined. An error message is displayed in step 106 and a feed hold is performed in step 107.

Turning now to FIG. 15, there is shown a subroutine generally designated 110 for converting the relative polar specification of an entry or retract vector to the absolute rectangular components of the vector. In the first step 111, the numerical control computer determines whether the interrupted block in the part program was using circular interpolation or linear interpolation. The difference is significant because the feed vector F is internally stored in a special format when circular interpolation is performed. Specifically, for circular interpolation the feed vector is internally stored indirectly as the inward radius vector of the current cut.

Figure 16:
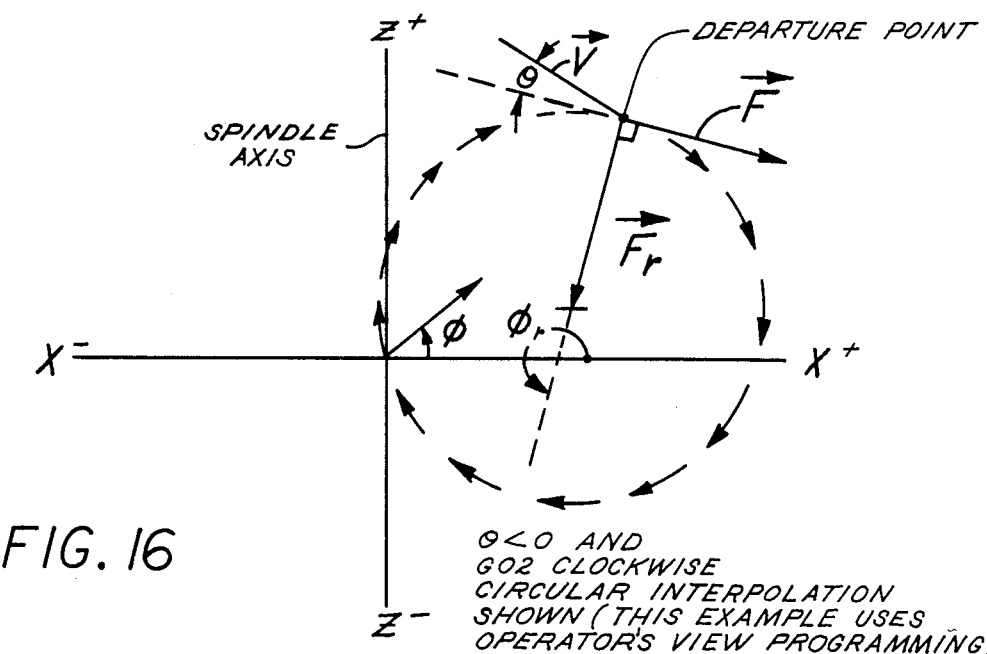
FIG. 16 is a diagram showing the definition of the feed vector when circular interpolation is being performed.

Digressing for a moment to FIG. 16, there is shown a diagram illustrating how the internally stored feed vector ($F_r$) is related to the actual feed vector (F) which is tangent to the circular machining path at the departure point. It should be evident that the absolute angle of the actual feed vector (F) can be obtained from the angle of the inward radial feed vector ($F_r$) by adding or subtracting $\pi/2$ radians, depending upon whether the circular interpolation is clockwise, as shown, or counterclockwise. Specifically, in step 113 of FIG. 15 the absolute angle ($\phi_r$) of the inward radius vector ($F_r$) is obtained by calling the angle calculation subroutine shown in FIG. 17. Then, in step 114 the numerical control computer checks whether the interpolation is clockwise or counterclockwise. If it is clockwise, then in step 115 the absolute angle ($\phi_f$) is obtained by subtracting $\pi/2$ radians from the absolute angle ($\phi_r$) of the inward radius vector. The resulting angle ($\phi_f$) is normalized to be greater than or equal to zero but less than $2\pi$ radians. Similarly, if the interpolation is circular counterclockwise, then in step 116 the absolute angle ($\phi_f$) is computed by adding $\pi/2$ radians to the absolute angle ($\phi_r$)

of the inward radius vector ($F_r$), and normalizing the result.

Returning now to step 111 of FIG. 15, if the current block move does not involve circular interpolation, then it is a linear move and in step 117 the rectangular components of the feed vector F are obtained directly from the linear interpolator. Next, in step 118 the angle calculation subroutine of FIG. 17 is called in order to calculate the absolute angle ($\phi_f$) of the feed vector (F).

Now that the absolute angle ($\phi_f$) of the feed vector (F) is obtained regardless of whether circular or linear interpolation is being performed, the absolute angle ($\phi$) of the retract or entry vector can easily be calculated by adding together the absolute angle ($\phi_f$) to the relative angle ($\phi$) and a constant $\pi$ radians. It should be noted that the sum of the relative angle ($\phi$) and $\pi$ radians represents the angle of the respective entry or retract vector with respect to the forward direction of the feed vector (F). The resulting absolute angle ($\phi$) is then normalized to be greater than or equal to zero or less than $2\pi$ radians. Finally, in step 120, the polar form of the retract or entry vector is converted to rectangular form by calling the polar to rectangular conversion subroutine shown in FIG. 17.

Figure 17:
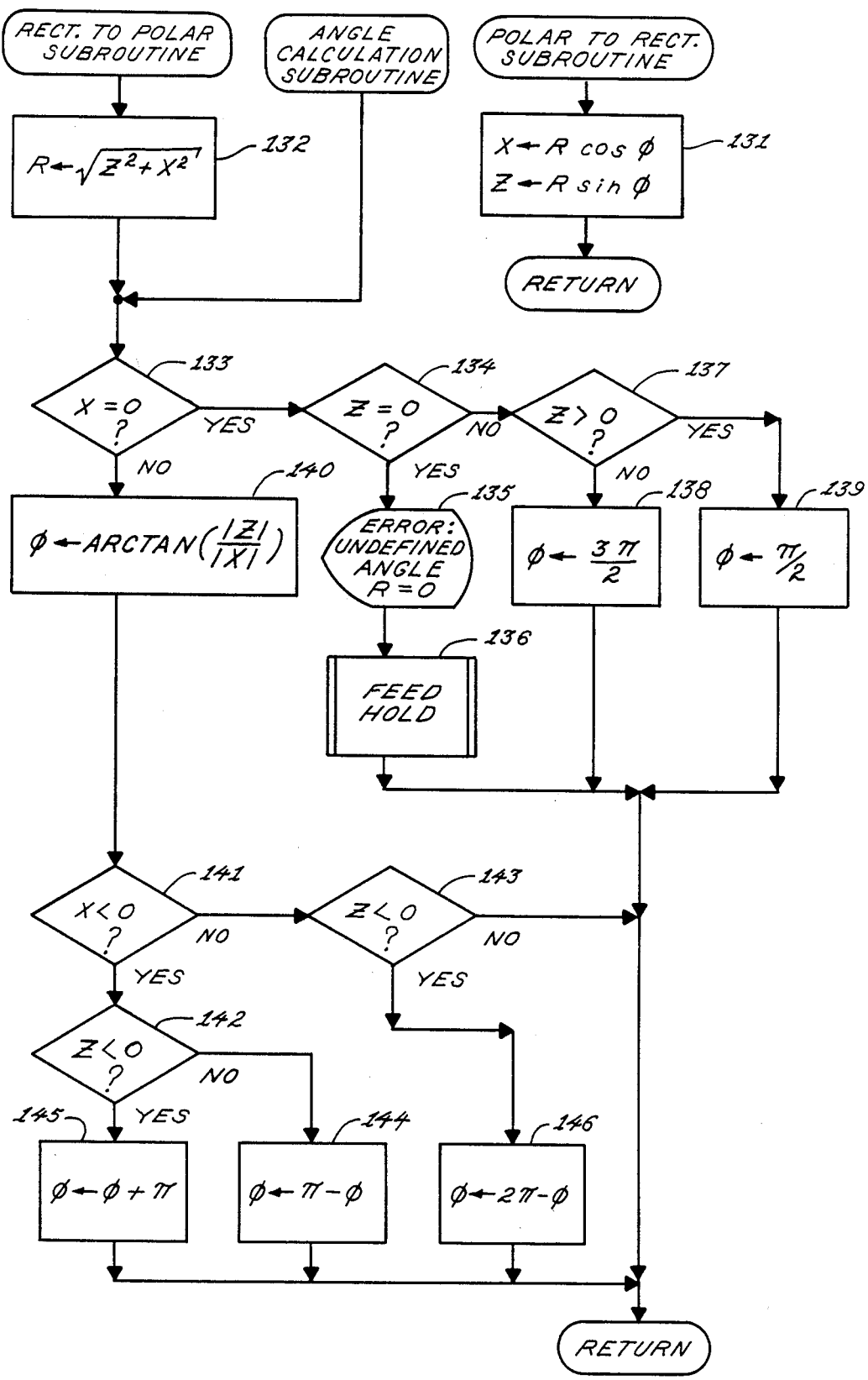
FIG. 17 is the flowchart of subroutines for conversion between rectangular and polar coordinates.

Specific examples of subroutines for converting between rectangular and polar coordinates and calculating the angle of a vector specified in rectangular coordinates are shown in FIG. 17. Conversion of polar to rectangular coordinates in step 131 is relatively straightforward. The X component is obtained by multiplying the magnitude (R) by the cosine of the absolute angle ($\phi$). In this regard the angle ($\phi$) equal to zero is defined as the positive direction of the X axis. In a similar fashion, the Z component of the vector is obtained by multiplying the magnitude (R) by the sine of the absolute angle ($\phi$).

Conversion from rectangular to polar coordinates is more complicated due to the fact that the particular quadrant in which the angle falls must be separately determined. In step 132 the magnitude (R) of the vector is easily obtained as the square root of the sum of the squares of the Z and X components. In general, the absolute angle ($\phi$) is the arc tangent of the ratio of the magnitudes of the Z and X components, but the case of ($\phi$) equals zero must be separately considered to prevent division by zero, and the quadrant in which the angle falls must also be determined.

In the initial step 133 the X component is compared to zero and if it is found to be zero then the absolute angle is either $\pi/2$ radians, $3\pi/2$ radians, or is indefinite. To resolve this ambiguity, in step 134 the Z component is compared to zero. If the Z component is zero, then in step 135 an error message is displayed saying that the angle is undefined since the magnitude (R) is zero, and in step 136 a feed hold is performed. Otherwise, in step 137, the Z component is again compared to zero to determine whether the Z component is positive or negative. If the Z component is negative then the absolute angle ($\phi$) is set to $3\pi/2$ radians in step 138. Otherwise, in step 139 the absolute angle ($\phi$) is set to $\pi/2$ radians.

If in step 133 the X component was not equal to zero, then in step 140 the absolute angle is computed as the arc tangent of the ratio of the magnitude of the Z component and the magnitude of the X component. The arc tangent, however, always results in an angle within the first quadrant, and the angle must be further adjusted if the vector lies in the other quadrants. For this purpose, in step 141 the X component of the vector is compared to zero, and in steps 142 or 143 the Z component is also compared to zero. If both components are not less than zero, then the vector lies in the first quadrant and the absolute angle ($\phi$) need not be adjusted. If the X component is less than zero but the Z component is not less than zero, then the vector lies in the second quadrant and the angle ($\phi$) is adjusted in step 144 by subtracting the angle ($\phi$) from $\pi$ radians. If the X component and the Z component are both less than zero, then the vector lies in the third quadrant, and the angle ($\phi$) is adjusted in step 145 by adding $\pi$ radians. Finally, if the X component is not less than zero but the Z component is less than zero, then the vector lies in the fourth quadrant, and in step 146 the angle ($\phi$) is adjusted by subtracting the angle ($\phi$) from $2\pi$ radians.

Figure 18A:
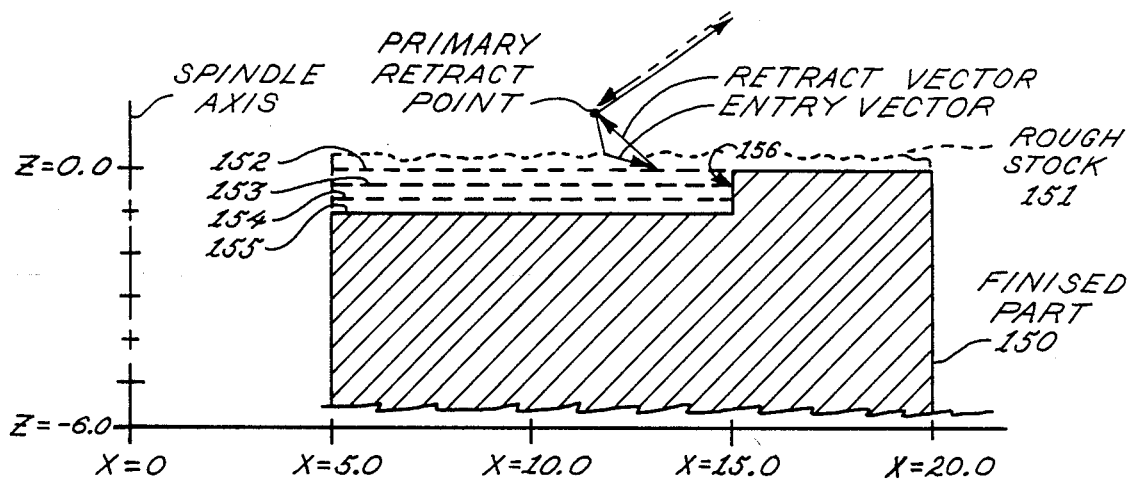
FIG. 18A is a schematic diagram illustrating a facing cut for a particular example of the programming for the safe retract method of the present invention.
Figure 18B:
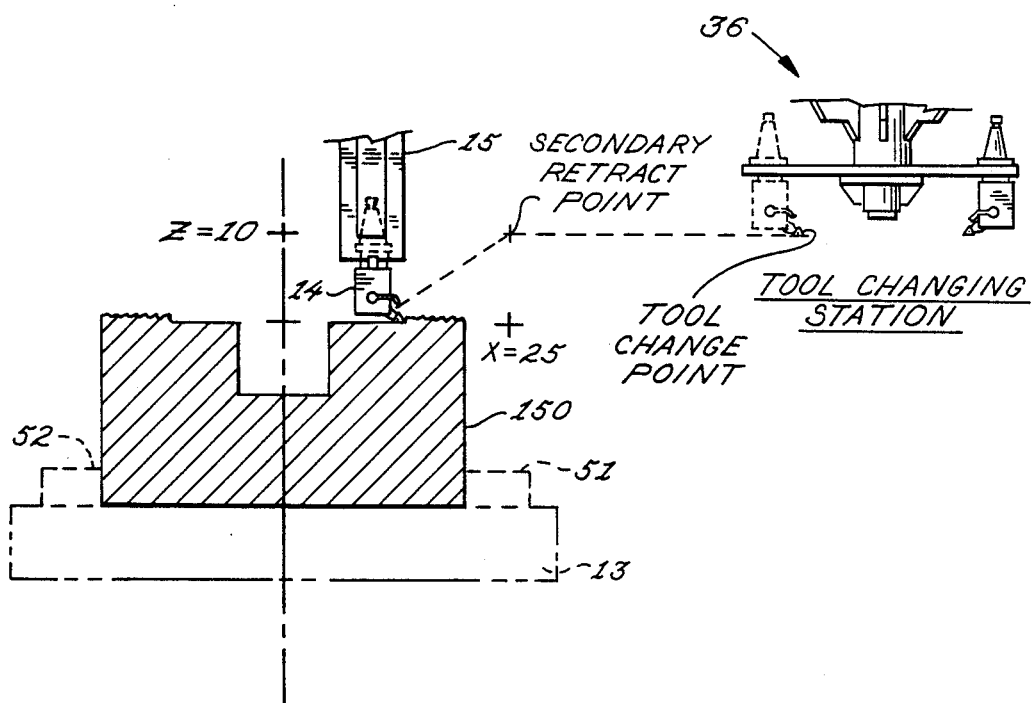
FIG. 18B is a schematic diagram showing the facing operation of FIG. 18A on a reduced scale and showing the path from the workpiece to the tool changing station.

Turning now to FIG. 18A, there is shown a specification on an enlarged scale for the machining of a finished part 150, including the "rough stock" dimensions 151 before machining, and a number of successive facing cuts 152, 153, 154 and 155. The workpiece 150 is shown on a reduced scale in FIG. 18B. FIG. 18B further shows the relationship between the part 150, the table 13, the tool 14 and ram 15, and the tool changing station 36.

Given the diagrams shown in FIGS. 18A and 18B, the part programmer can write a part program for performing the facing cuts, and an interrupt subprogram for safely retracting the tool 14 to the tool changing station 36 and resuming machining with a new tool in the event that excessive tool wear or tool breakage is sensed at an arbitrary point along the machining paths 152-155. A listing of a sample program is shown in Appendix I.

In order to organize the programming tasks, the programmer may first flowchart the machining problem is illustrated in FIGS. 19A and 19B. The main part program is defined by the flowchart generally designated 160 in FIG. 19A and the interrupt subprogram is defined by the flow chart 170 in FIG. 19B. The interrupt subprogram 170 includes those steps that are executed in response to a tool wear or tool breakage trigger signal during the interruption of the main program 160.

In the first step 161 of the main program 160, the ram 15 and tool 14 are rapidly traversed to a predefined clearance position prior to the first facing cut 152. Next in step 162, the machining parameters such as the tool feed (IPR), the spindle speed (SFM), the tool to be used, the machining offset, the machining direction, the machining range, and flood coolant function are defined. In step 163 the tool monitor is enabled and limit conditions are defined. Then in step 164 the limit responses or actions are also defined.

Now that the machining and tool monitoring parameters have been defined, the actual machining may proceed. In step 165 the tool is positioned to the start of the first machining cut 152 and the facing operation is performed. Next, in step 166, the tool is positioned to the start of the second cut 153, and machining occurs along this second cut. In step 167, the tool is positioned to the start of the third cut 154 and the third cut is performed. In step 168, the tool is positioned to the start of the fourth cut 155 and the fourth cut is performed to finish the workpiece. In a final step 169, the tool 14 is rapidly traversed to the clearance position. Rotation of the worktable 13 is stopped and the coolant supply is shut off.

The interrupt subprogram 170 of FIG. 19B is executed after a tool wear or tool breakage trigger signal. The internally defined subroutines, as shown in FIGS.

10 and 12 and described above, retract the tool 14 from the workpiece 150 to the primary retract point (see FIG. 18A) before the interrupt subprogram 170 is called. In the first step 171, the coordinates of the primary retract point are saved in memory in order that a new tool may be returned to the primary retract point for the resumption of machining. Next, in step 172, the tool 14 is moved directly to the secondary retract point from which the tool changing station 36 is reached. At this time, the programmer assumes that the new tool is in the sixth position of the tool changing station and, therefore, the original tool is changed with tool No. 6. Then in step 173, offsets for the new tool are probed so that the cutting edges of the new tool No. 6 are precisely correlated with the positions of the edges of the original tool. Finally, in step 174, the new tool is returned to the coordinates of the primary retract point. These coordinates are the coordinates that were saved in memory in the first step 171. Upon returning from the interrupt subprogram 170, the internally defined engage subroutine shown in FIG. 14 and previously described is executed to engage the new tool with the workpiece and to resume machining.

Turning now to the specific code of the main program in Appendix I, it can be seen that each line or block of the main program is prefixed by a line or block number following the alphabetic code "N". After each line number, there is one or more Type 1 or Type 2 codes. The first line or block N1 includes a code in parentheses. The parentheses indicate that the code is a Type 2 code. The three letter code PGM identifies that the Type 2 code is used to assign the name "RFACE" to the main program. The next block N10 includes a Type 1 code G0 for point-to-point positioning, a code G90 specifying absolute coordinates, a code X30.0 denoting the value of the X coordinate, and a code Z10.0 denoting the Z coordinate. In other words, the tool 14 is rapidly positioned to a clearance point at X=30 and Z=10.

The third block N20 includes a G0 and a G90 code as before, and further includes a G95 code defining the feed rate (IPR) in terms of inches per revolution, a code G96 specifying constant surface speed (SFM), a code F0.025 setting the feed rate to 0.025 inches per revolution, a code S400 setting the surface speed (SFM) to 400 feet per minute, a code X4.9 setting an X coordinate to 4.9, a code T2 commanding a tool change to the second tool, a code D2 choosing a second offset, a code M03 starting the table rotating in the forward direction, a code M08 turning on the coolant flow, and a code M41 setting the high range for spindle or table rotation. As a result of this second step, the tool is positioned to a clearance position at X=4.9, Z=10.

The next block N30 includes the code M74 to turn on the cut horsepower monitor and Type 2 codes using the three-letter code HPM to define an HPM_UPPER limit for generating a trigger signal when the cut horsepower HPC is greater than 60, and also to define an HPM_WEAR limit to generate a trigger signal when the average cut horsepower AVHPC is greater than 50.

The next block N40 includes a Type 2 code to define the retract vector to have a length of two inches and a relative angle of 45° clockwise from the reverse of the current feed direction. The code P2 specifies that after completing tool retraction, execution is to continue immediately into a user-defined subroutine for the HPM_WEAR limit.

The next block N41 enables and defines the subroutine RETSUB to be the user-defined subroutine executed after tool retraction for the HPM_WEAR condition.

The next block N42 includes a Type 2 code for enabling entry back to the machining path for the HPM_WEAR condition. The Type 2 code specifies that the tool is to be moved to an approach point that is 0.5 inches at an angle of 5° clockwise from the reverse of the feed direction along the interrupted machining path. The code P2 specifies that once the tool reaches the approach point, the tool is to be reengaged with the workpiece along the entry vector and machining is to resume.

The block N43 includes a Type 2 code enabling a tool retract in response to the HPM_UPPER limit condition. Since the code in the N43 block does not define a retract vector, the internal retract tool subroutine of FIG. 12 will use the retract vector previously defined in the block N40. The block N43 also includes the code P1, so that the defined retract is followed by a master stop.

Now that the conditions for machining and the limit conditions have been defined, the main program continues with a number of blocks that perform the machining operations. These blocks include the point-to-point positioning or rapid traversal code G0 to specified coordinates, and the machining moves specified by the code G1 to programmed coordinates. The block N50 positions the tool down to Z=0.03 for the first facing cut 152. The next block N60 actually performs the first facing cut 152 and the tool monitor is active for this machining operation and the subsequent machining moves. The blocks N70 to N90 successively position the tool for the second facing cut 153. This cut is performed in block N100. At the end of the cut 153, in block N110 a move in the upward Z direction is performed to turn up on the edge 156. During this upward move, the non-modal code M70 inhibits tool retraction. Then blocks N120 and N130 position the tool for the third facing cut 154, which is performed in block N140. At the end of the third facing cut 154, in block N150 tool retraction is inhibited and a move in the upward Z direction is performed to turn up on the edge 156. Similarly, blocks N160 and N170 reposition the tool for the final facing cut 155 performed in block N180. At the end of the final facing cut 155, in block N190 tool retraction is non-modally inhibited by the M70 code and the tool is moved upwardly to turn up on the edge 156.

After the machining operations, in block N200 the tool is rapidly traversed vertically to a clearance position at Z=10.0. Then, in block N210, the tool is moved horizontally to a second clearance position at X=30. Moreover, a code M05 stops rotation of the table and a code M09 shuts off the flow of coolant. Finally, in block N220, the code M02 flags the end of the main program.

Turning now to the interrupt subprogram, it should be recalled that the interrupt subprogram is executed after tool retraction to the primary retract point. In the first block N1, the name of the interrupt subprogram is defined as "RETSUB" corresponding to the name used in block N41 of the main program. The Type 2 code also includes a code 2 reserving space for two parameters. These two parameters are further defined in blocks N10 and N20. In block N10, the first parameter P1 is defined as the X coordinate of the tool position at the start of the interrupt subprogram. In other words, the X coordinate of the retract point is saved in the memory location P1. Similarly, in block N20 the second parameter P2 is defined as the Z coordinate of the primary retract point.

The next block N30 uses the G0 rapid traverse and the G90 absolute coordinate codes to rapidly move the tool to a secondary retract point at X=25 and Z=10, as shown in FIG. 18B. Then in block N40, the code T6 replaces the current tool with tool No. 6 and the code D6 makes offset No. 6 active. Next in block N50, the code M92 extends the tool checking probe. The Type 2 code CLS is a call to a tool offset checking subroutine called PRBTOOL having three parameters including the maximum offset change allowed in the X and Z directions and the tool offset number to be modified, respectively. After tool checking, in block N60 the code M90 retracts the tool checking probe and the tool is rapidly returned to the X=25 and Z=10 secondary retract point. Finally, in block N70, the tool is rapidly returned to the primary retract point specified by the coordinates saved in the parameters P1 and P2.

In view of the above, a tool monitoring system been disclosed that uses an easily programmed automatic safe retract and return strategy. The strategy avoids collision and interference between the workpiece and tool in all cases and reduces imperfections in the surface finish of the machined workpiece. The programmer is provided with a set of inherently defined functions in Type 1 and Type 2 machine control codes that give the programmer great flexibility in programming a general safe retract and return function, but which includes internal checks and default conditions which reduce the likelihood of programmers error during implementation of a specific safe retract and return strategy. The programmer may define the retract and entry vectors in polar fashion relative to the direction of machining. This facilitates maintaining the retract and entry angles over curved cuts. Moreover, the sign of the relative angle is related in a readily apparent fashion to whether the workpiece is to one side or the other side of the machining path in the X-Z plane. Programming of the general safe retract and return function may be further facilitated by allowing the part programmer to specify limit conditions in Boolean form. In this fashion, the part programmer has available to him all of the internally defined parameters describing the machining conditions encountered by the tool.

APPENDIX I

LISTING OF SAMPLE MAIN PROGRAM AND INTERRUPT SUBPROGRAM FOR TOOL CHANGING

Main Program

```
N1    (PGM,RFACE)
N10   G0 G90 X30.0 Z10.0
N20   G0 G90 G95 G96 F0.025 S400. X4.9 T2 D2 M03 M08 M41
N30   M74 (HPM,U60 W50)
N40   (ENR,HPM_WEAR,R2.0 T-45 P2)
N41   (ENS,HPM_WEAR,RETSUB)
N42   (ENE,HPM_WEAR,R0.5 T-5 P2)
N43   (ENR,HPM_UPPR,P1)
N50   G0 Z0.03
N60   G1 X20.1
N70   G0 Z1.0
N80   G0 X4.9
N90   G0 Z-0.33
N100  G1 X14.97
N110  M70 G1 Z0.03
N120  G0 X4.9
N130  G0 Z-0.66
N140  G1 X14.97
N150  M70 G1 Z-0.33
N160  G0 X4.9
N170  G0 Z-0.97
N180  G1 X14.97
N190  M70 G1 Z-0.66
N200  G0 Z10.0
N210  G0 X30. M05 M09
N220  M02
```

Interrupt Subprogram

```
N1    (PGM,RETSUB;2)
N10   (LET,P1=PSPOSX)
N20   (LET,P2=PSPOSZ)
N30   G0 G90 X25.0 Z10.0
N40   T6 D6
N50   M92 (CLS,PRBTOOL;0.02,0.02,6)
N60   M90 X25.0 Z10.0
N70   X=P1, Z=P2
```

APPENDIX II

RETRACT/ENTRY PROGRAMMING POSSIBILITIES

| ENR Programmed/<br>ENS and/or ENE<br>Programmed | (ENR,LIMIT,R1.T45.)<br>or<br>(ENR,LIMIT,R1.T45.P0) | (ENR,LIMIT,R1.T45.P1) | (ENR,LIMIT,R1.T45.P2) |
|---|---|---|---|
| ENS Not Programmed<br>ENE Not Programmed | CASE A | CASE I | CASE Q |
| (ENS,LIMIT,ABORT_SUB) | CASE B | CASE J | CASE R |
| (ENS,LIMIT,ABORT_SUB)<br>(ENE,LIMIT,R1.T45.)<br>or<br>(ENE,LIMIT,R1.T45.P0) | CASE C | CASE K | CASE S |
| (ENS,LIMIT,ABORT_SUB)<br>(ENE,LIMIT,R1.45.P1) | CASE D | CASE L | CASE T |
| (ENS,LIMIT,ABORT_SUB)<br>(ENE,LIMIT,R1.T45.P2) | CASE E | CASE M | CASE U |
| (ENE,LIMIT,R1.T45.)<br>or<br>(ENE,LIMIT,R1.T45.P0) | CASE F | CASE N | CASE V |
| (ENE,LIMIT,R1.T45.P1) | CASE G | CASE O | CASE W |
| (ENE,LIMIT,R1.T45.P2) | CASE H | CASE P | CASE X |

CASE A: When the limit occurs, a retract occurs along the programmed retract vector to the primary retract point. When the primary retract point is reached, feed hold becomes active. The interrupted block may be resumed by incrementing back to path and exiting feed hold or by use of the path recovery button.

CASE B: When the limit occurs, a retract occurs along the programmed retract vector to the primary retract point. When the primary

APPENDIX II-continued
RETRACT/ENTRY PROGRAMMING POSSIBILITIES

|  |  |
|---|---|
|  | retract point is reached, feed hold becomes active. Since a subroutine is pending, the feed hold point is the primary retract point, not the departure point. If the axes are incremented away from the primary retract point, they must be returned to the primary retract point before exit of feed hold to the enabled subroutine is allowed. When the feed hold is exited, the enabled subroutine executes. Feed hold may be used at any time in the interrupt subroutine. When the subroutine is completed, a feed hold occurs because no entry code was programmed. The interrupted block may be resumed by incrementing back to path and exiting feed hold or by use of the path recovery button. |
| CASE C: | When the limit occurs, a retract occurs along the programmed retract vector to the primary retract point. When the primary retract point is reached, feed hold becomes active. When feed hold is exited by pushing cycle start, the enabled subroutine executes. When the subroutine is finished, the axes position to the approach point. When the approach point is reached, a feed hold becomes active. When feed hold is exited by pushing cycle start, the axes feed to the departure point before automatically resuming the interrupted block. |
| CASE D: | When the limit occurs, a retract occurs along the programmed retract vector to the primary retract point. When the primary retract point is reached, feed hold becomes active. When feed hold is exited by pushing cycle start, the enabled subroutine executes. When the subroutine is finished, the axes position to the approach point. When the approach point is reached, a master stop occurs, stopping all machine motion and removing cycle start. |
| CASE E: | When the limit occurs, a retract occurs along the programmed retract vector to the primary retract point. When the primary retract point is reached, feed hold becomes active. When feed hold is exited by pushing cycle start, the enabled subroutine executes. When the subroutine is finished, the axes position to the approach point. When the approach point is reached, the axes immediately feed to the departure point before immediately resuming the interrupted block. |
| CASE F: | When the limit occurs, a retract occurs along the programmed retract vector to the primary retract point. When the primary retract point is reached, feed hold becomes active. When feed hold is exited by pushing cycle start, the axes position to the approach point. When the approach point is reached, a feed hold occurs. When feed hold is exited by pushing cycle start, the axes feed to their abort coordinates before automatically resuming the interrupted block. |
| CASE G: | When the limit occurs, a retract occurs along the programmed retract vector to the primary retract point. When the primary retract point is reached, feed hold becomes active. When feed hold is exited by pushing cycle start, the axes position to the approach point. When the approach point is reached, a master stop occurs. |
| CASE H: | When the limit occurs, a retract occurs along the programmed retract vector to the primary retract point. When the primary retract point is reached, feed hold becomes active. When feed hold is exited by pushing cycle start, the axes position to the approach point. When the approach point is reached, the axes feed to the departure |

APPENDIX II-continued
RETRACT/ENTRY PROGRAMMING POSSIBILITIES

| | |
|---|---|
| | point before automatically resuming the interrupted block. |
| CASES I-P: | When the limit occurs, a retract occurs along the programmed retract vector to the primary retract point. When the primary retract point is reached, a master stop occurs, leaving the axes at the primary retract point. The interrupted block may not be resumed. |
| CASE Q: | Case Q is the same as Case A because there is no subroutine or entry enable. |
| CASE R: | When the limit occurs, a retract occurs along the programmed retract vector to the primary retract point. When the primary retract point is reached, the enabled subroutine immediately starts executing. When the subroutine is completed, a feed hold occurs. The interrupted block may be resumed by incrementing back to path and exiting feed hold or by use of the path recovery button. |
| CASE S: | When the limit occurs, a retract occurs along the programmed retract vector to the primary retract point. When the primary retract point is reached, the enabled subroutine immediately starts executing. When the subroutine is completed, the axes position to the approach point. When the approach point is reached, a feed hold becomes active. When the feed hold is exited by pushing cycle start, the axes feed to the departure point before automatically resuming the interrupted block. |
| CASE T: | When the limit occurs, a retract occurs along the programmed retract vector to the primary retract point. When the primary retract point is reached, the subroutine ABORT_SUB immediately starts executing. When the subroutine is completed, the axes position to the approach point. When the approach point is reached, a master stop occurs. |
| CASE U: | When the limit occurs, a retract occurs along the programmed retract vector to the primary retract point. When the primary retract point is reached, the subroutine ABORT_SUB immediately starts executing. When the subroutine is completed, the axes position to the approach point. When the approach point is reached, the axes immediately feed to the departure point before immediately resuming the interrupted block. Case U requires no operator intervention. |
| CASE V: | When the limit occurs, a retract occurs along the programmed retract vector to the primary retract point. When the primary retract point is reached, the axes position to the approach point. When the approach point is reached, a feed hold becomes active. When feed hold is exited by pushing cycle start, the axes feed to the departure point before automatically resuming the interrupted block. |
| CASE W: | When the limit occurs, a retract occurs along the programmed retract vector to the primary retract point. When the primary retract point is reached, the axes position to the approach point. When the approach point is reached, a master stop occurs. |
| CASE X: | Case X was made to be the same as Case V. When the limit occurs, a retract occurs along the programmed retract vector to the primary retract point. When the primary retract point is reached, the axes position to the approach point. When the approach point is reached, the axes feed hold to the departure point before automatically resuming the interrupted block. |

What is claimed is:

wherein the method further comprises the steps of, said retract vector being determined by said predetermined values of said signals based upon the direction of said machining path in the region of said departure point, and automatically moving the tool relatively with respect to said workpiece back to the machining path along an approach path originating from an approach point displaced from the retract point including an entry vector comprising a straight move along an entry path at a grazing angle terminating on said machining path, and resuming the interrupted relative movement along said machining path, wherein said entry vector is determined at least inpart by a predetermined approach signal based upon the direction of said machining path in the region of said departure point.

2. The method as claimed in claim 1, wherein said approach signal determines the angle between said entry vector and said direction of said machining path in the region of said departure point.

3. The method as claimed in claim 2, wherein the angle between said entry vector and the reverse of said direction of said machining path is an acute grazing angle and the terminal point of said entry vector is said departure point.

4. A method of operating a numerically controlled machine tool of the kind having an original cutting tool relatively moved with respect to a workpiece, the original cutting tool being relatively moved during normal operation along a machining path during the execution of a part program including instructions defining the machining path, said method including the steps of interrupting the relative movement of the original cutting tool along the machining path at an arbitrary departure point in response to a trigger signal generated in response to the comparison of a tool degradation signal to a predetermined threshold, and automatically moving the original cutting tool relative to the workpiece to a tool change location in such a fashion that interference between the original cutting tool and the workpiece does not occur, said step of automatically moving the original cutting tool including the steps of moving the original cutting tool along an incremental retract vector from said departure point to a retract point, automatically moving the original cutting tool from said retract point to said tool change point, changing the original cutting tool and automatically moving the changed cutting tool back to the machining path without interference between the changed cutting tool and the workpiece, and resuming machining along the machining path using the changed cutting tool,
   wherein the method further comprises,
   said step of automatically moving the changed cutting tool back to the machining path includes relatively moving the changed tool with respect to the workpiece along an entry vector beginning at an approach point displaced from the retract point and comprising a straight move along an entry path at a grazing angle terminating at the departure point, wherein said retract vector has a substantial angle with respect to the reverse direction of the machining path, and said entry vector has a smaller grazing angle with respect to the reverse direction of the machining path, so that remachining of the workpiece does not occur and a relatively smooth surface is obtained on the workpiece at the location of the departure point.

5. The method as claimed in claim 4, wherein said entry vector is determined based upon the direction of said machining path in the region of said departure point and a predetermined signal specifying the magnitude of the angle of the entry vector with respect to the direction of said machining path in the region of said departure point.

6. The method as claimed in claim 4, wherein said steps of automatically moving the changed cutting tool back to the machining path includes the steps of reverse retracing the path of the original cutting tool from said retract point to said tool change location so that the changed cutting tool is moved from the tool change location to the departure point, and thereafter relatively moving the changed cutting tool with respect to the workpiece directly from the departure point to the initial point defined by said entry vector.

7. The method as claimed in claim 4, wherein said step of interrupting the relative movement of the original cutting tool along the machining path at an arbitrary departure point in response to a trigger signal generated in response to the comparison of a tool degradation signal to a predetermined threshold is conditioned on the engagement and disengagement of said original cutting tool and said workpiecce.

8. The method as claimed in claim 7, wherein said step of interrupting is conditioned on the engagement and disengagement of said original cutting tool for selected respective beginning and ending distances within a cut through the workpiece.

9. The method as claimed in claim 7, wherein said machining path is specified as a series of moves including certain machining moves programmed in said part program, and said step of interrupting is conditioned by being inhibited for a selected beginning distance and a selected ending distance of said machining moves.

10. A method of operating a numerically controlled machine tool of the kind having an original cutting tool relatively moved with respect to a workpiece, the original cutting tool being relatively moved during normal operation along a machining path during the execution of a part program including instructions defining the machining path, said method including the steps of interrupting the relative movement of the original cutting tool along the machining path at an arbitrary departure point in response to a trigger signal generated in response to the comparison of a tool degradation signal to a predetermined threshold, and automatically moving the original cutting tool relative to the workpiece to a tool change location in such a fashion that interference between the original cutting tool and the workpiece does not occur, said step of automatically moving the original cutting tool including the steps of moving the original cutting tool along an incremental retract vector from said departure point to a retract point, automatically moving the original cutting tool from said retract point to said tool change point, changing the original cutting tool and automatically moving the changed cutting tool back to the machining path without interference between the changed cutting tool and the workpiece, and resuming machining along the machining path using the changed cutting tool,
   wherein the method further comprises,
   said step of interrupting the relative movement of the original cutting tool along the machining path at an arbitrary departure point in response to a trigger signal generated in response to the comparison of a tool degradation signal to a predetermined threshold is conditioned on the position of said original cutting tool for selected respective beginning and ending distances of specified machining moves through the workpiece, and wherein for a consecutive series of said machining moves, the selected beginning distance is applied only to the first cut in said series, and the selected ending distance is applied only to the last cut in said series.

11. A method of operating a numerically controlled machine tool of the kind having a cutting tool relatively moved with respect to a workpiece, the cutting tool being relatively moved during normal operation along a machining path during the execution of a part program including instructions defining the machining path as a number of machining moves, said method including the steps of interrupting the relative movement of the cutting tool along the machining path at an arbitrary departure point in response to a trigger signal generated in response to the comparison of a tool degradation signal to a predetermined threshold, and automatically disengaging the cutting tool from the workpiece in such a fashion that interference between the cutting tool and the workpiece does not occur, wherein the method further comprises, the depth of cut is specified in said part program for beginning and ending points of said machining moves, and said tool degradation signal is generated by determining the position of the tool within the current one of said machining moves and in response to said position determining the current depth of cut from the specified depths of cut at the beginning and ending points of the current one of said machining moves by interpolation, and generating said tool degradation signal based upon said current depth of cut.

12. The method as claimed in claim 11 wherein said interpolation is linear.

13. A method of operating a numerically controlled machine tool of the kind having a cutting tool relatively moved with respect to a workpiece, a numerical computer and control program for executing a part program, the cutting tool being relatively moved during normal operation along a machining path during the execution of said part program including instructions defining the machining path, said method including the steps of interrupting the relative movement of the cutting tool along the machining path at an arbitrary departure point in response to a plurality of trigger signals and automatically moving the cutting tool relative to the workpiece to predefined locations in such a fashion that interference between the cutting tool and the workpiece does not occur, said step of automatically moving the cutting tool including an initial step of moving the cutting tool along an incremental retract vector from said departure point to a retract point, the retract vector being determined at least in part by signals representing predetermined values for certain parameters and the identity of the trigger signal, wherein the method further comprises,
generating said trigger signals by sensing conditions at the interface between said cutting tool and workpiece during the relative movement of said cutting tool along said machining path, and operating said numerical computer to repetitively execute instructions in said control program to determine the values of a plurality of signals responsive to said sensed conditions and to compare selected ones of said values to selected threshold values to generate triggering signals for respective actions,
wherein the signals, threshold values, and actions are selected in response to definitional function calls coded in the part program and interpreted during the execution of said part program.

14. The method as claimed in claim 13, wherein said signals and threshold values are specified by conditional expression in said definitional function calls.

15. The method as claimed in claim 14, wherein said conditional expression are Boolean expressions defining respective trigger signals.

16. A method of operating a numerically controlled machine tool of the kind having a cutting tool relatively moved with respect to a workpiece along a programmed feed vector when the cutting tool is engaged with the workpiece so that material is removed from the workpiece by the cutting tool, said method causing said cutting tool being initially disengaged from said workpiece to become engaged with said workpiece at a predetermined point and comprising the steps of:
(a) obtaining the angle of said feed vector with respect to said machine tool at said predetermined point;
(b) adding said predetermined angle to said angle of said feed vector with respect to said machine tool to obtain a third angle;
(c) determining an approach point displaced from said predetermined point along an entry vector having said third angle with respect to said machine tool;
(d) relatively moving said cutter in a straight line motion to said approach point; and
(e) moving said cutter directly in a straight line motion to said predetermined point at a narrow grazing angle.

17. The method as claimed in claim 16, wherein said machine tool includes means for performing circular interpolation by computing a radial vector with respect to the machine tool, and said step (a) comprises obtaining the angle of the radial vector, and adjusting said angle of the radial vector by $\pi/2$ radians.

* * * * *